(12) United States Patent
Fleming et al.

(10) Patent No.: US 6,779,636 B2
(45) Date of Patent: Aug. 24, 2004

(54) PARK-BRAKE MONITORING-SYSTEM FOR A VEHICLE

(75) Inventors: William R. Fleming, Fort Wayne, IN (US); Norman K. Arnold, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/271,212

(22) Filed: Oct. 15, 2002

(65) Prior Publication Data

US 2004/0069580 A1 Apr. 15, 2004

(51) Int. Cl.[7] .............................................. F16D 66/00
(52) U.S. Cl. ................................. 188/1.11 E; 340/453
(58) Field of Search ...................... 188/1.11 W, 1.11 E, 188/265; 303/20, 89, 122; 340/453

(56) References Cited

U.S. PATENT DOCUMENTS

| | | | | |
|---|---|---|---|---|
| 4,809,177 A | | 2/1989 | Windle et al. | |
| 5,148,894 A | * | 9/1992 | Eddy, Jr. | 188/265 |
| 5,180,038 A | * | 1/1993 | Arnold et al. | 188/171 |
| 5,825,287 A | * | 10/1998 | Zarybnicky et al. | 340/453 |
| 5,853,348 A | | 12/1998 | Lehman | |
| 6,263,269 B1 | | 7/2001 | Dannenberg | |
| 6,299,261 B1 | * | 10/2001 | Weiberle et al. | 303/20 |
| 6,533,082 B2 | * | 3/2003 | Gill et al. | 188/156 |
| 6,586,927 B2 | * | 7/2003 | Pfeil et al. | 324/207.2 |

* cited by examiner

Primary Examiner—Thomas Williams
(74) Attorney, Agent, or Firm—Jeffrey P. Calfa; Dennis Kelly Sullivan; Susan L. Lukasik

(57) ABSTRACT

A park-brake monitoring-system monitors the selected and actual operational states of a park-brake system of a vehicle. The park-brake monitoring-system includes one or more selected-state sensor(s) that produce signals implicative of the selected operational state of the park-brake system and one or more actual state sensor(s) that produce signal(s) implicative of the actual-operational state of the park-brake system. Logic device(s) of the park-brake monitoring-system operate dependent upon input from both the selected state sensor(s) and the actual state sensor(s).

28 Claims, 20 Drawing Sheets

ALLOWED AND NON-ALLOWED CIRCUMSTANCES OF OPERATION OF A PARK BRAKE MONITORING SYSTEM CONFIGURED IN SUCH A MANNER THAT COMMUNICATION OF AN UNDER-TRAVEL SIGNAL TO THE LOGIC DEVICE(S) IS NOT DISCERNIBLE FROM THE COMMUNICATION OF AN OVER-TRAVEL SIGNAL TO THE LOGIC DEVICE(S)

| SIGNAL COMMUNICATED TO LOGIC DEVICE(S) BY SELECTED-STATE SIGNAL-PRODUCING DEVICE(S) | SIGNAL COMMUNICATED TO LOGIC DEVICE(S) BY ACTUAL-STATE SIGNAL-PRODUCING DEVICE(S) | | |
|---|---|---|---|
| | UNDER-TRAVEL | FULL-TRAVEL | OVER-TRAVEL |
| SET-REQUESTED | 201 NON-ALLOWED COMBINATION | 202 ALLOWED COMBINATION | 203 NON-ALLOWED COMBINATION |
| RELEASE-REQUESTED | 204 ALLOWED COMBINATION | 205 NON-ALLOWED COMBINATION | 206 ALLOWED COMBINATION |

APPROPRIATE ACTIONS OF LOGIC DEVICE(S) OF A PARK BRAKE MONITORING SYSTEM CONFIGURED IN SUCH A MANNER THAT COMMUNICATION OF AN UNDER-TRAVEL TO THE LOGIC DEVICE(S) IS DISCERNIBLE FROM THE COMMUNICATION OF AN OVER-TRAVEL SIGNAL TO THE LOGIC DEVICE(S)

| | | SIGNAL COMMUNICATED TO LOGIC DEVICE(S) BY ACTUAL-STATE SIGNAL-PRODUCING DEVICE(S) | | |
|---|---|---|---|---|
| | | UNDER-TRAVEL | FULL-TRAVEL | OVER-TRAVEL |
| SIGNAL COMMUNICATED TO LOGIC DEVICE(S) BY SELECTED-STATE SIGNAL-PRODUCING DEVICE(S) | SET-REQUESTED | 301 *EXECUTE MALFUNCTION-VERIFICATION ALGORITHM *PRODUCE MONITOR SIGNAL THAT IS ERROR SIGNAL *ACTIVATE PARK-BRAKE SYSTEM/PARK-BRAKE MONITORING-SYSTEM MALFUNCTION INDICATOR *STORE FAULT CODE THAT IS INTERPRETABLE TO INDICATE MALFUNCTION OF PARK-BRAKE SYSTEM AND/OR PARK-BRAKE MONITORING-SYSTEM IN COMPUTER MEMORY | 302 *PRODUCE PARK-BRAKE-SET SIGNAL *ACTIVATE PARK-BRAKE-SET INDICATOR | 303 *EXECUTE MALFUNCTION-VERIFICATION ALGORITHM *PRODUCE MONITOR SIGNAL THAT IS ERROR SIGNAL *ACTIVATE PARK-BRAKE SYSTEM/PARK-BRAKE MONITORING-SYSTEM MALFUNCTION INDICATOR *STORE FAULT CODE THAT IS INTERPRETABLE TO INDICATE MALFUNCTION OF PARK-BRAKE SYSTEM AND/OR PARK-BRAKE MONITORING-SYSTEM IN COMPUTER MEMORY |
| | RELEASE-REQUESTED | 304 *PRODUCE PARK-BRAKE-RELEASED SIGNAL *ACTIVATE PARK-BRAKE-RELEASED INDICATOR | 305 *EXECUTE MALFUNCTION-VERIFICATION ALGORITHM *PRODUCE MONITOR SIGNAL THAT IS ERROR SIGNAL *ACTIVATE PARK-BRAKE SYSTEM/PARK-BRAKE MONITORING-SYSTEM MALFUNCTION INDICATOR *STORE FAULT CODE THAT IS INTERPRETABLE TO INDICATE MALFUNCTION OF PARK-BRAKE SYSTEM AND/OR PARK-BRAKE MONITORING-SYSTEM IN COMPUTER MEMORY | 306 *PRODUCE PARK-BRAKE-RELEASED SIGNAL *ACTIVATE PARK-BRAKE-RELEASED INDICATOR |

ALLOWED AND NON-ALLOWED CIRCUMSTANCES OF OPERATION OF A PARK BRAKE MONITORING SYSTEM CONFIGURED IN SUCH A MANNER THAT COMMUNICATION OF AN UNDER-TRAVEL SIGNAL TO THE LOGIC DEVICE(S) IS DISCERNIBLE FROM THE COMMUNICATION OF AN OVER-TRAVEL SIGNAL TO THE LOGIC DEVICE(S)

| | | SIGNAL COMMUNICATED TO LOGIC DEVICE(S) BY ACTUAL-STATE SIGNAL-PRODUCING DEVICE(S) | | |
|---|---|---|---|---|
| | | UNDER-TRAVEL | FULL-TRAVEL | OVER-TRAVEL |
| SIGNAL COMMUNICATED TO LOGIC DEVICE(S) BY SELECTED-STATE SIGNAL-PRODUCING DEVICE(S) | SET-REQUESTED | 601 NON-ALLOWED COMBINATION | 602 ALLOWED COMBINATION | 603 NON-ALLOWED COMBINATION |
| | RELEASE-REQUESTED | 604 ALLOWED COMBINATION | 605 NON-ALLOWED COMBINATION | 606 NON-ALLOWED COMBINATION |

APPROPRIATE ACTIONS OF PARK-BRAKE-MONITORING-SYSTEM LOGIC DEVICES
(UNDER TRAVEL SIGNAL DISCERNIBLE FROM OVER-TRAVEL SIGNAL)

| | | SIGNAL COMMUNICATED TO LOGIC DEVICE(S) BY ACTUAL-STATE SIGNAL-PRODUCING DEVICE(S) | | |
| --- | --- | --- | --- | --- |
| | | UNDER-TRAVEL | FULL-TRAVEL | OVER-TRAVEL |
| SIGNAL COMMUNICATED TO LOGIC DEVICE(S) BY SELECTED-STATE SIGNAL-PRODUCING DEVICE(S) | SET-REQUESTED | 701*EXECUTE MALFUNCTION-VERIFICATION ALGORITHM *PRODUCE MONITOR SIGNAL THAT IS ERROR SIGNAL *ACTIVATE PARK-BRAKE SYSTEM/PARK-BRAKE MONITORING-SYSTEM MALFUNCTION INDICATOR *STORE FAULT CODE THAT IS INTERPRETABLE TO INDICATE MALFUNCTION OF PARK-BRAKE SYSTEM AND/OR PARK-BRAKE MONITORING-SYSTEM IN COMPUTER MEMORY | 702*PRODUCE PARK-BRAKE-SET SIGNAL *ACTIVATE PARK-BRAKE-SET INDICATOR | 703*EXECUTE MALFUNCTION-VERIFICATION ALGORITHM *PRODUCE MONITOR SIGNAL THAT IS ERROR SIGNAL *ACTIVATE PARK-BRAKE SYSTEM/PARK-BRAKE MONITORING-SYSTEM MALFUNCTION INDICATOR *STORE FAULT CODE THAT IS INTERPRETABLE TO INDICATE MALFUNCTION OF PARK-BRAKE SYSTEM AND/OR PARK-BRAKE MONITORING-SYSTEM IN COMPUTER MEMORY |
| | RELEASE-REQUESTED | 704*PRODUCE PARK-BRAKE-RELEASED SIGNAL *ACTIVATE PARK-BRAKE-RELEASED INDICATOR | 705*EXECUTE MALFUNCTION-VERIFICATION ALGORITHM *PRODUCE MONITOR SIGNAL THAT IS ERROR SIGNAL *ACTIVATE PARK-BRAKE SYSTEM/PARK-BRAKE MONITORING-SYSTEM MALFUNCTION INDICATOR *STORE FAULT CODE THAT IS INTERPRETABLE TO INDICATE MALFUNCTION OF PARK-BRAKE SYSTEM AND/OR PARK-BRAKE MONITORING-SYSTEM IN COMPUTER MEMORY | 706*PRODUCE PARK-BRAKE-RELEASED SIGNAL *ACTIVATE PARK-BRAKE-RELEASED INDICATOR |

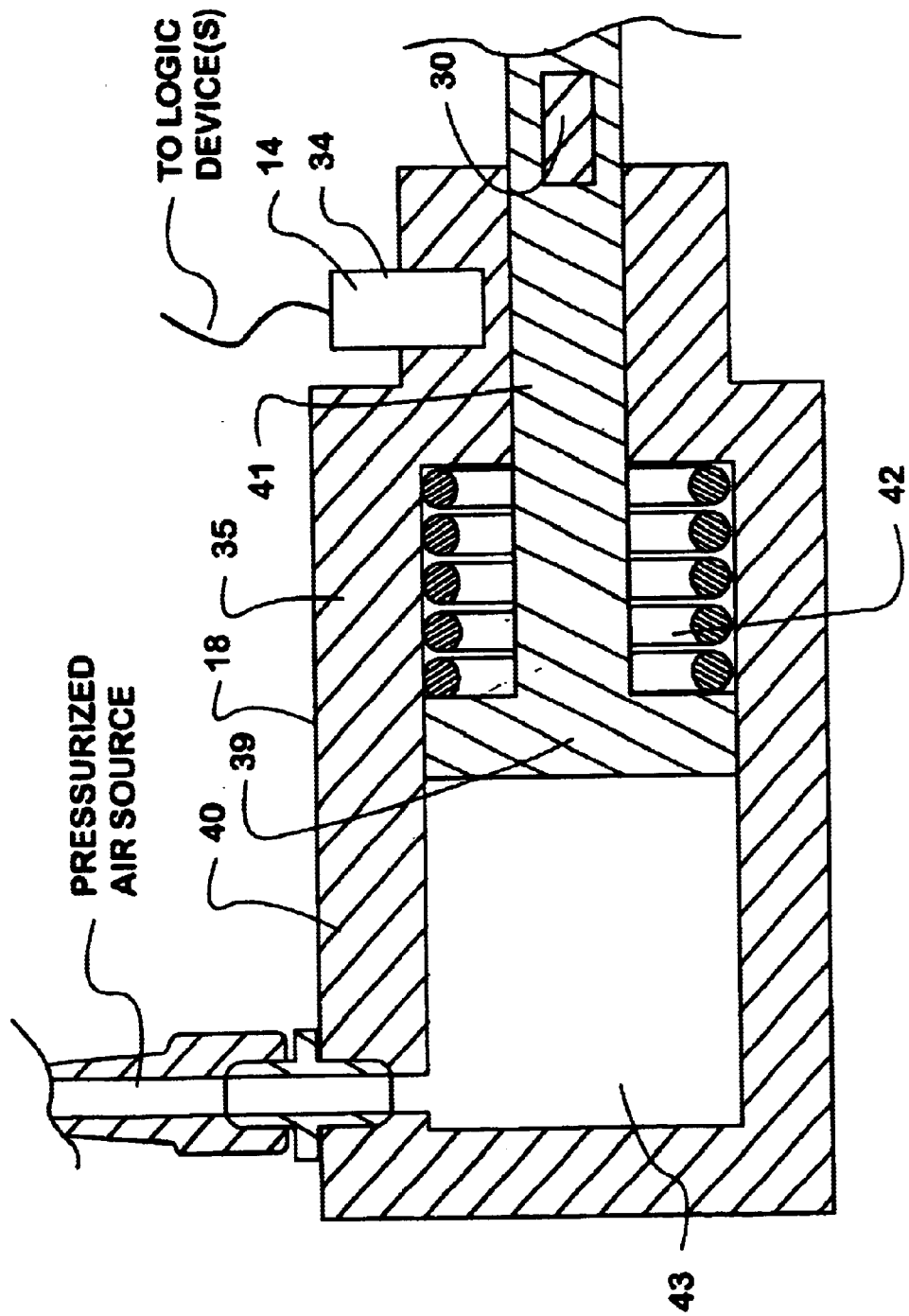

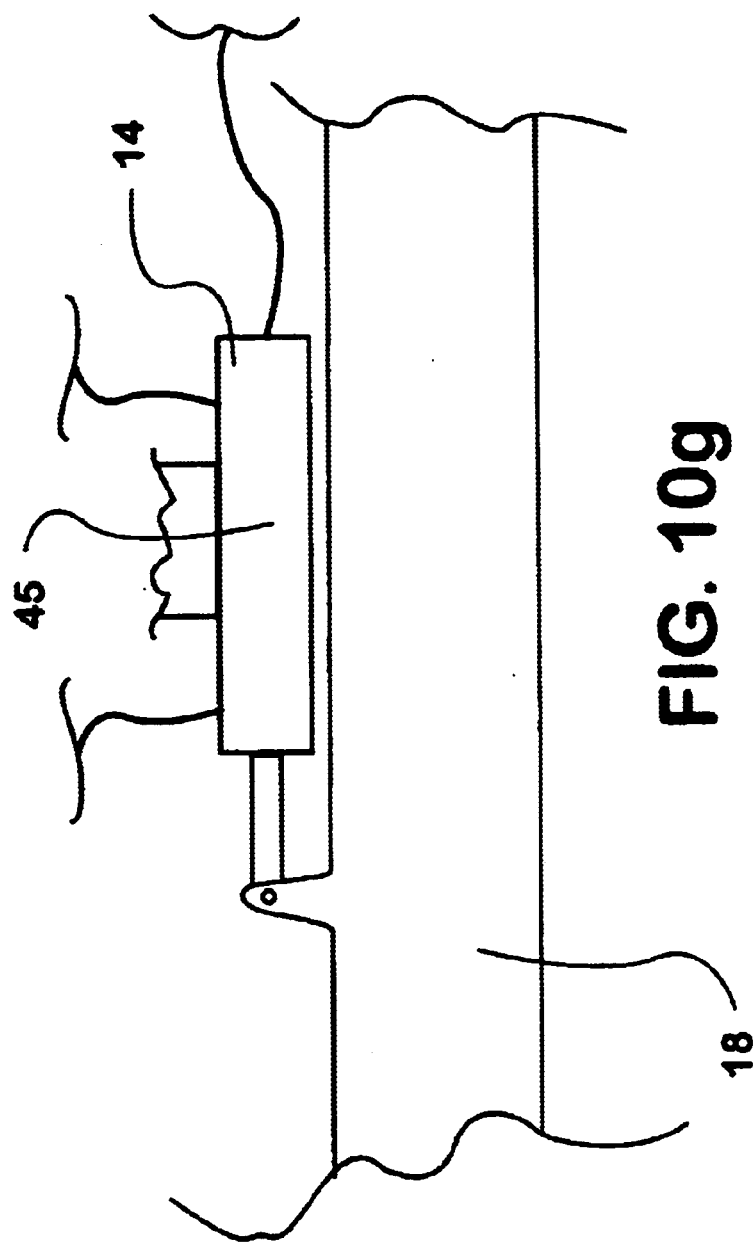

PARK-BRAKE MONITORING-SYSTEM FOR A VEHICLE

BACKGROUND OF THE INVENTION

The present invention relates to park-brake monitoring-systems of vehicles for monitoring the operational state of the park-brake system of the vehicle and/or monitoring the park-brake system of the vehicle for potential malfunctions. Vehicles to which the present invention relates generally include one or more frame structures to which a majority of other components of the vehicle are engaged directly or indirectly and which serve to locate the other components of the vehicle relative to one another. Additionally vehicles that the present invention relates to generally include a suspension system to which the one or more frame structures of the vehicle are engaged and from which the one or more frame structures derive support. The suspension system of a vehicle to which the present invention relates includes one or more ground-engaging components. As mentioned above, vehicles to which the present invention relates comprise a park-brake system. The function of the park-brake system is to selectively allow or prevent movement of the vehicle along the ground dependent upon the operational state of the park-brake system. One or more of the ground-engaging components of vehicles to which the present invention relates are engaged to the frame structure(s) thereof in such a manner that, when the park-brake system has a released operational state, those ground-engaging components can rotate relative to the frame structure(s) and the ground, thus, providing for easy rolling of the vehicle over the ground. The park-brake system is constructed and engaged to the vehicle in such a manner that, when the park-brake system has a set operational state, the park-brake system is engaged between one or more of the ground-engaging components and the frame structure(s) of the vehicle in such a manner to prevent relative rotation therebetween and to, thus, prevent movement of the vehicle along the ground. Thus, when an operator of the vehicle wishes to drive the vehicle, they effect a released operational state of the park-brake system to allow movement of the vehicle along the ground and, when the operator of the vehicle wishes to leave the vehicle unattended, they can effect a set operational state of the park-brake system to prevent inadvertent, undesirable movement of the vehicle along the ground.

There are many known constructions of vehicles and park-brake systems that function in the manner described above. All such systems generally comprise braking components that are mounted directly or indirectly to the frame structure(s) of the vehicle or the ground-engaging components of the vehicle. When such park-brake systems have a released operational state, the braking components thereof are disengaged from whichever of the frame structure(s) and the ground-engaging components they are not mounted to. In order to effect a set operational state of such a park-brake system the braking components thereof must be moved to a position in which they are engaged to both the frame structure(s) of the vehicle and the ground-engaging components in such a manner preventing relative rotation therebetween. Such park-brake systems include park brake-actuating components that are engaged to the braking components in such a manner that they can be actuated in order to move the braking components from the positions they occupy when the park-brake system has a released operational state to the positions they occupy when the park-brake system has a set operational state. The park-brake-actuating components can further be retracted to allow or effect movement of the braking component(s) from the position(s) they occupy when the park-brake system has a set operational state to the position(s) they occupy when the park-brake system has a released operational state. Such park-brake systems further include park-brake-system controls that are useable by an operator of the vehicle to control actuation and retraction of the park-brake-actuating components and, thus, the operational state of the park-brake system.

Many different park-brake monitoring-systems are known. The purpose of known park-brake monitoring-systems is to either monitor the operational state of the park-brake system or to monitor the park-brake system for potential failure thereof. Known park-brake monitoring-systems include sensor(s) that are communicatively linked to logic device(s), visual indicators, and/or audio indicators. These sensor(s) of known park-brake monitoring-systems produce signals that are dependent upon conditions present in the park-brake system including conditions related to the braking components thereof, the park-brake-actuating components thereof, and/or the park-brake-system controls thereof. The sensor(s) of known park-brake monitoring systems include selected-state sensor(s) and/or actual-state sensor(s). Selected-state sensors interact with the park-brake-system controls and produce signals that are dependent upon conditions dictated by the state of the park-brake-system controls. Thus, the signals produced by selected-state sensors are implicative of the selected operational state of the park-brake system and the operational state (set or released) that the park-brake system has, when the park-brake system is functioning properly. Actual-state sensors interact with the park-brake-actuating components of the park-brake system and produce signals that are dependent upon conditions dictated by the positions of the park-brake-actuating components. Thus, the signals produced by actual-state sensors are implicative of the actual operational state (set or released) of the park-brake system. Many known park-brake monitoring-systems utilize either only selected-state sensor(s) or only actual-state sensor(s). Known park-brake monitoring-systems that have both selected-state sensor(s) and actual-state sensor(s) utilize the signals produced by the selected-state sensor(s) and the signals produced by the actual-state sensor(s) independently. Monitoring of a park-brake system by independently utilizing signals produced by selected-state sensor(s) and actual-state sensor(s) can result in false determinations of the actual operational state of the park-brake system as well as false determinations that the park-brake system is functioning properly and false determinations that the park-brake system is malfunctioning. For example a determination of the operational state of a park-brake system based only upon signals from selected-state sensor(s) may be erroneous if the park-brake-actuating components or the braking components of the park-brake system are malfunctioning. Also a determination of proper functioning or malfunctioning of the park-brake system based only upon signals produced by the actual-state sensor(s) may be erroneous if the park-brake monitoring-system is malfunctioning.

SUMMARY OF INVENTION

As a result, an object of the present invention is to provide a park-brake monitoring-system that is less likely to produce false indications of the actual operational state of the park-brake system it monitors and/or that is capable of providing accurate indications of malfunction of the park-brake monitoring-system and/or the park-brake system in situations where known park-brake monitoring systems would not provide an indication of such malfunctions.

The park-brake monitoring-system of the present invention includes one or more selected-state sensor(s) and one or more actual-state sensor(s). The park-brake monitoring-system of the present invention also includes one or more logic device(s), one or more of which are communicatively linked with both one or more of the selected-state sensor(s) and one or more of the actual-state sensor(s) of the park-brake monitoring-system. The selected-state sensor(s) of the park-brake monitoring-system interact with the park-brake-system controls of the park-brake system it monitors and produce and communicate to the logic device(s) signals that are implicative of a requested operational state of the park-brake system. The actual-state sensor(s) of the park-brake monitoring-system interact with the park-brake-actuating components of the park-brake system it monitors and produce and communicate to the logic device(s) signals that are implicative of an actual operational state of the park-brake system. The logic device(s) of the park-brake monitoring-system operate according to logic to produce monitoring signals that are dependent upon both the signals received from the selected-state sensor(s) and the actual-state sensor(s). The monitoring signals produced by the logic device(s) of the park-brake monitoring-system include signals indicative of an operational state of the park-brake system it monitors and/or error signals that indicate that the park-brake system and/or the park brake monitoring system is malfunctioning. Because the park-brake monitoring-system of the present invention utilizes signals from both the selected-state sensor(s) and the actual-state sensor(s) in dependent manner the possibility of erroneous monitoring signals being produced by the logic device(s) of the park-brake monitoring system is significantly reduced as compared to prior art park-brake monitoring-systems.

Thus, it can be seen that the above-mentioned object, as well as others not mentioned, have been met by the park-brake monitoring-system of the present invention.

DRAWINGS

Other objects and advantages of the invention will become more apparent upon perusal of the detailed description thereof and upon inspection of the drawings in which:

FIG. 2 is chart that reflects signal combinations that are considered to be allowed and non-allowed for a park-brake monitoring-system that is configured in such a manner that the communication of an under-travel signal to the logic device(s) is not discernible from the communication of an over-travel signal to the logic-device(s).

FIG. 3 is chart that lists actions that may be appropriately executed in different circumstances by the logic device(s) of a park-brake monitoring-system that is configured in such a manner that the communication of an under-travel signal to the logic device(s) is not discernible from the communication of an over-travel signal to the logic-device(s).

Figure 5A:
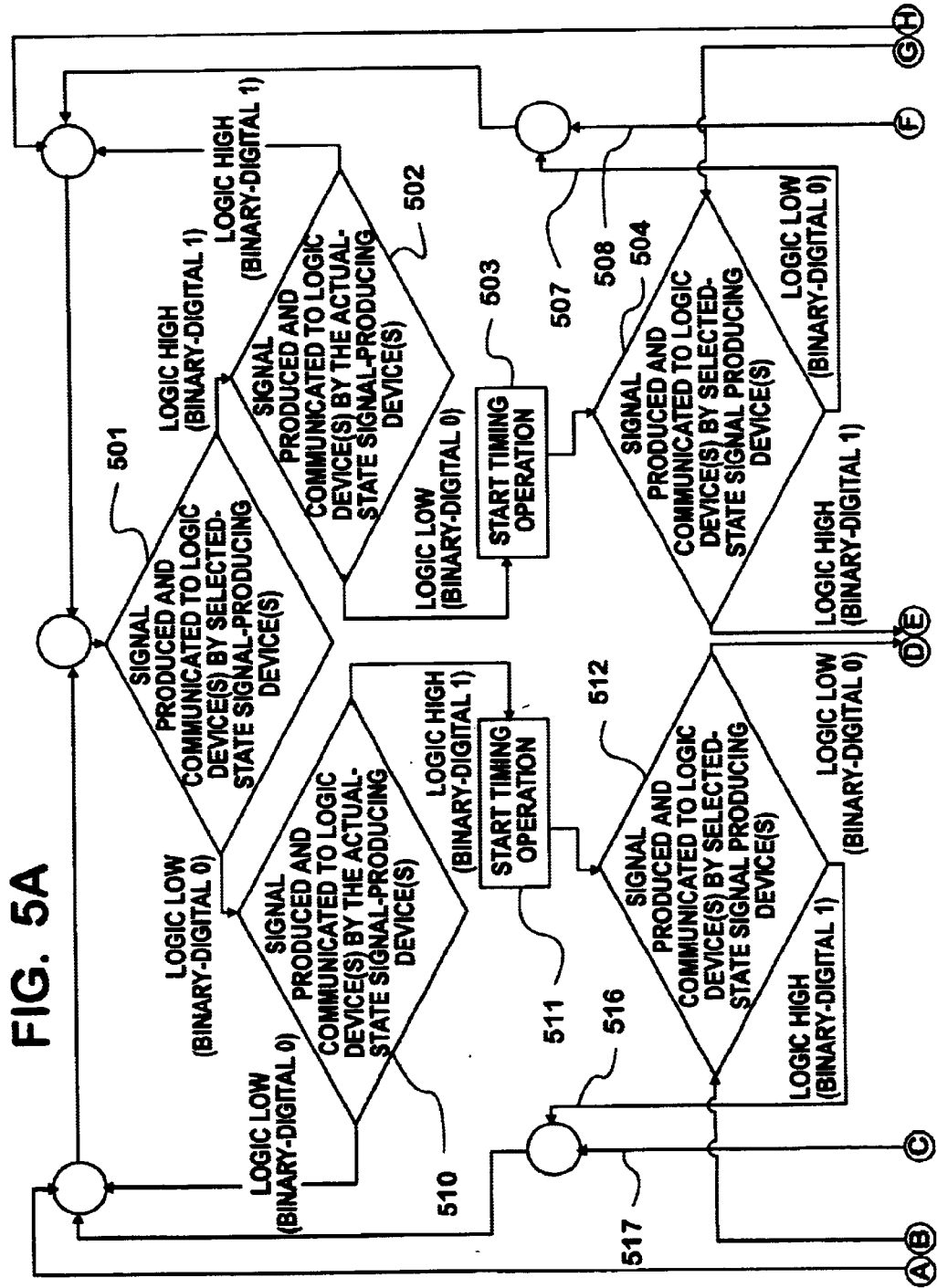
Figure 5B:
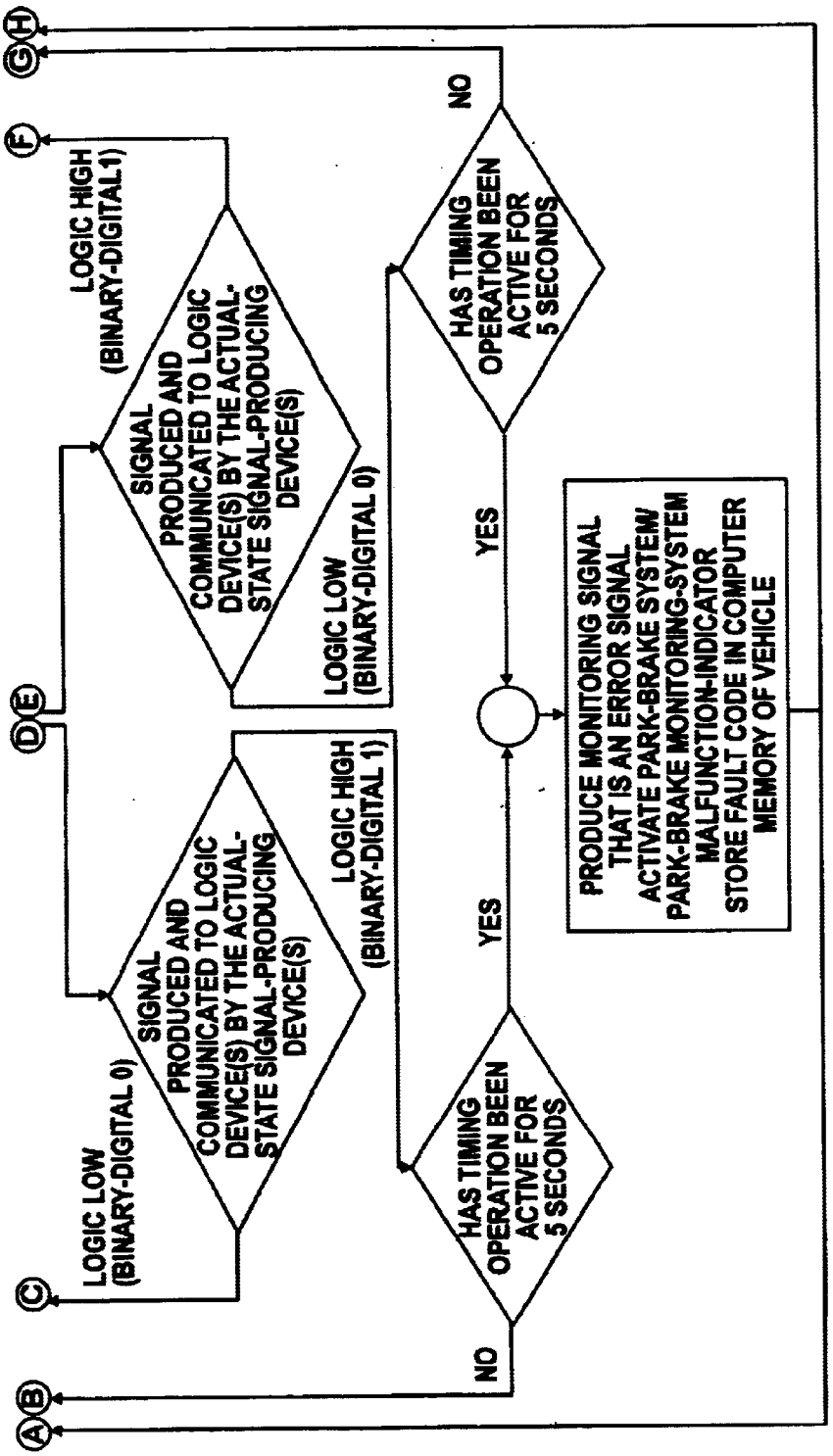

FIG. 5a is a first portion of and FIG. 5b is the balance of a flow chart illustrating one specific embodiment of a malfunction verification algorithm according to the present invention for a park-brake monitoring system configured in such a manner that, receipt of a signal combination comprising a signal from the selected-state sensors that is of a different logical value (high or low) than a signal received from the actual-state sensors is considered to be a receipt of a non-allowed signal combination.

FIG. 6 is chart that reflects signal combinations that are considered to be allowed and non-allowed for a park-brake monitoring-system that is configured in such a manner that the communication of an under-travel signal to the logic device(s) is discernible from the communication of an over-travel signal to the logic-device(s).

FIG. 7 is chart that lists actions that may be appropriately executed in different circumstances by the logic device(s) of a park-brake monitoring-system that is configured in such a manner that the communication of an under-travel signal to the logic device(s) is discernible from the communication of an over-travel signal to the logic-device(s).

FIG. 8a is a view, mostly in section, of one embodiment of a powered actuator showing it disposed within its under-travel range of positions.

Figure 8B:
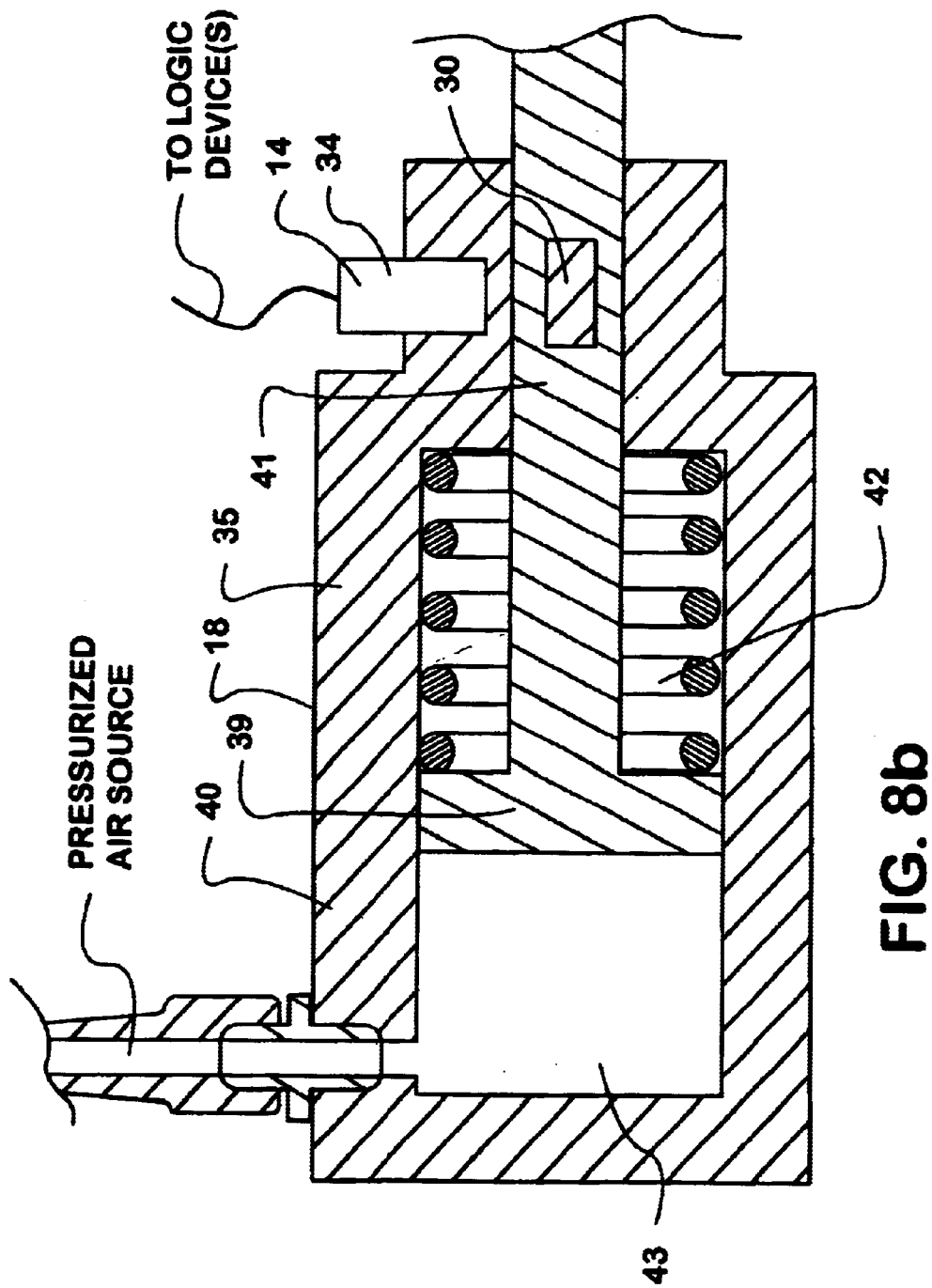

FIG. 8b is a view, mostly in section, of one embodiment of a powered actuator showing it disposed within its full-travel range of positions.

Figure 8C:
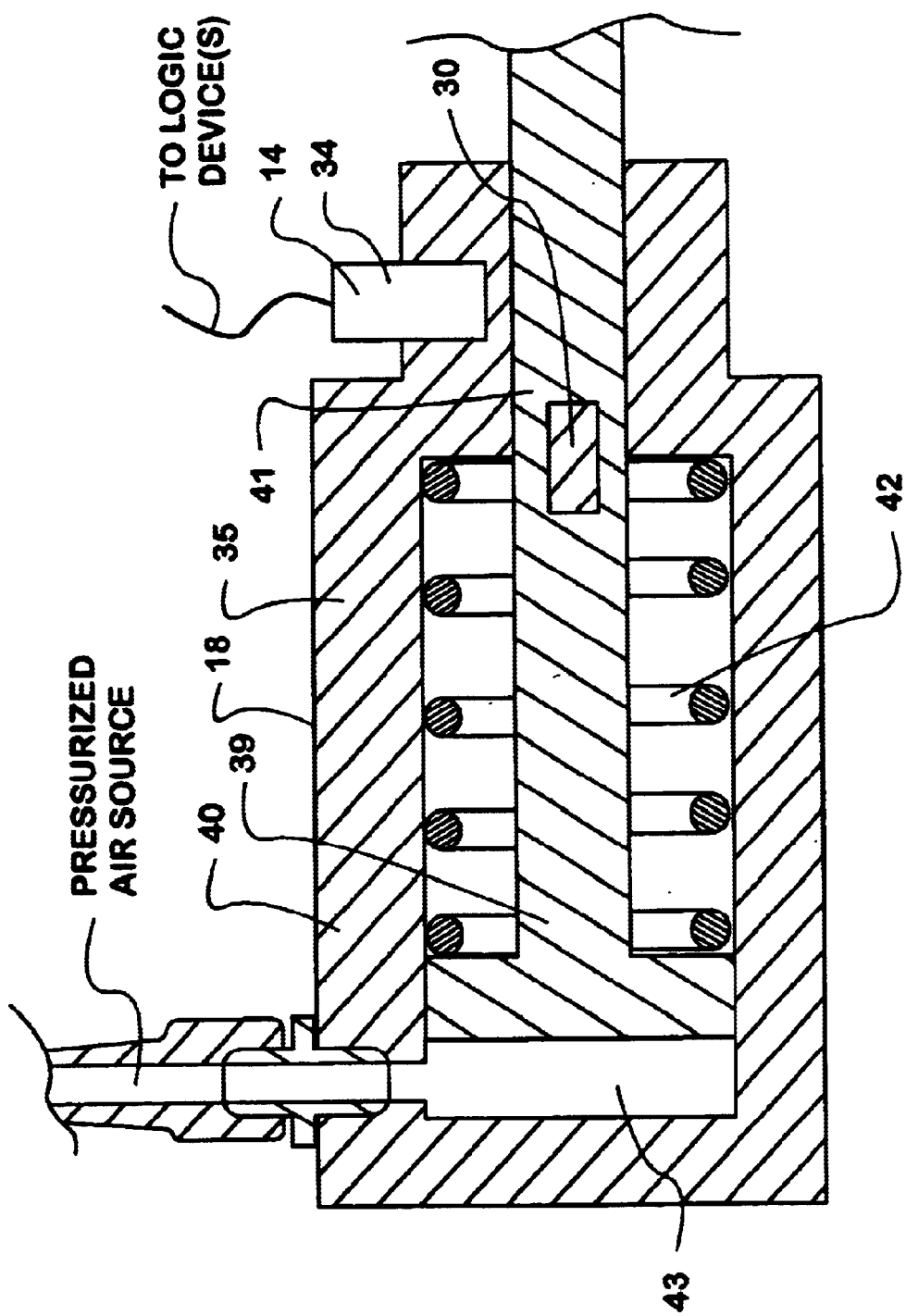

FIG. 8c is a view, mostly in section, of one embodiment of a powered actuator showing it disposed within its over-travel range of positions.

Figure 9:
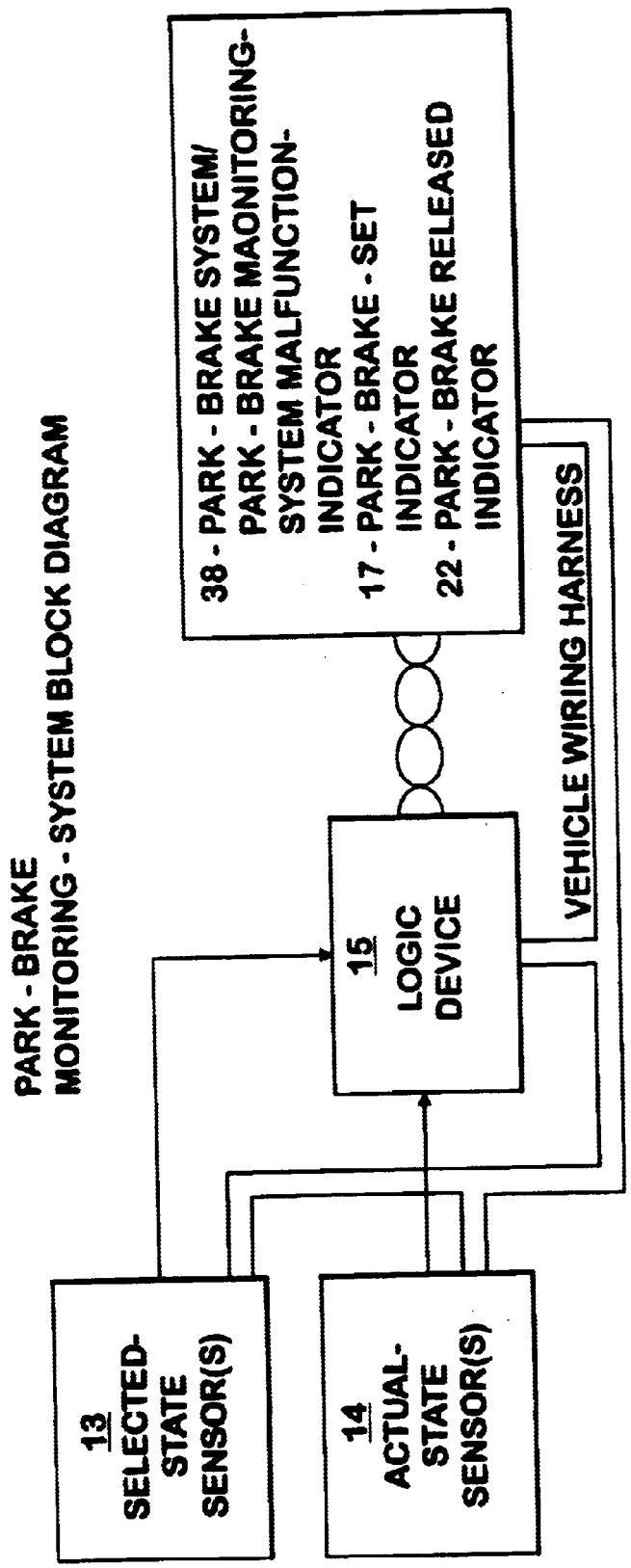

FIG. 9 is a block diagram of one embodiment of a park-brake monitoring-system according to the present invention.

Figure 10A:
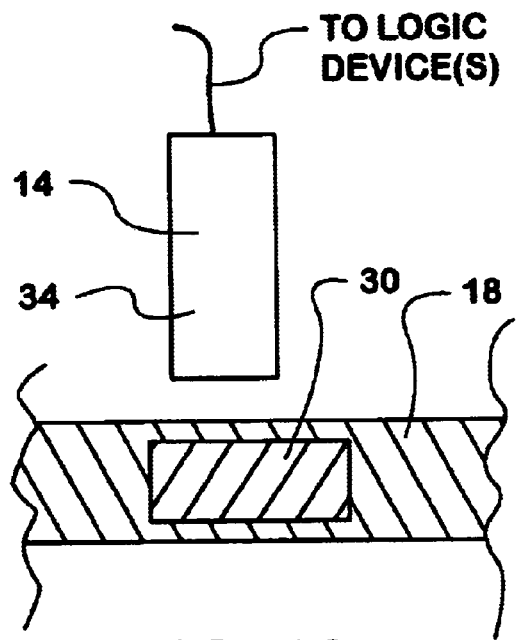

FIG. 10a is a view of a park-brake-actuating component that is configured for linear motion during actuation and retraction and that has a single position-marking structure that is constructed of ferrous material attached to it and adjacent which a single actual-state sensor that is a hall-effect sensor is disposed.

Figure 10D:
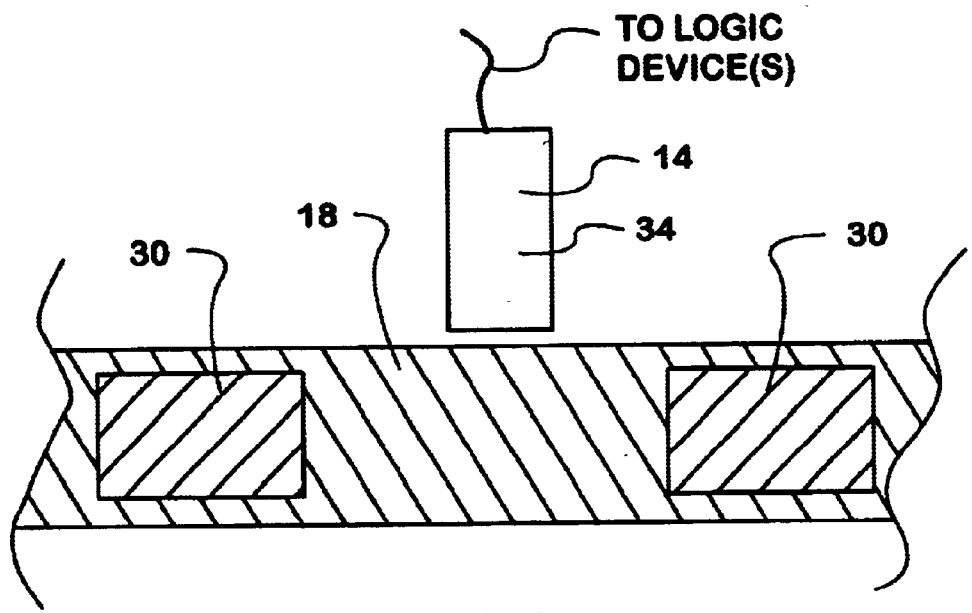
Figure 10B:
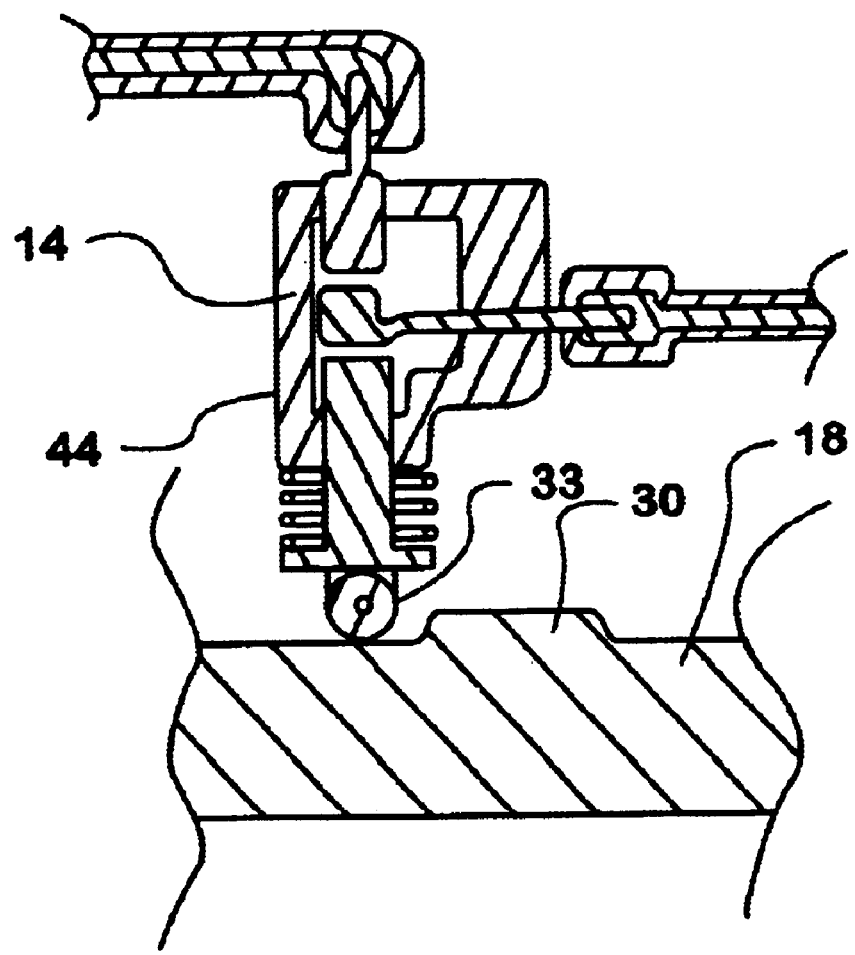

FIG. 10b is a view of a park-brake-actuating component that is configured for linear motion during actuation and retraction and that has a single position-marking structure attached to it and adjacent which a single actual-state sensor that is a mechanical switch is disposed.

Figure 10E:
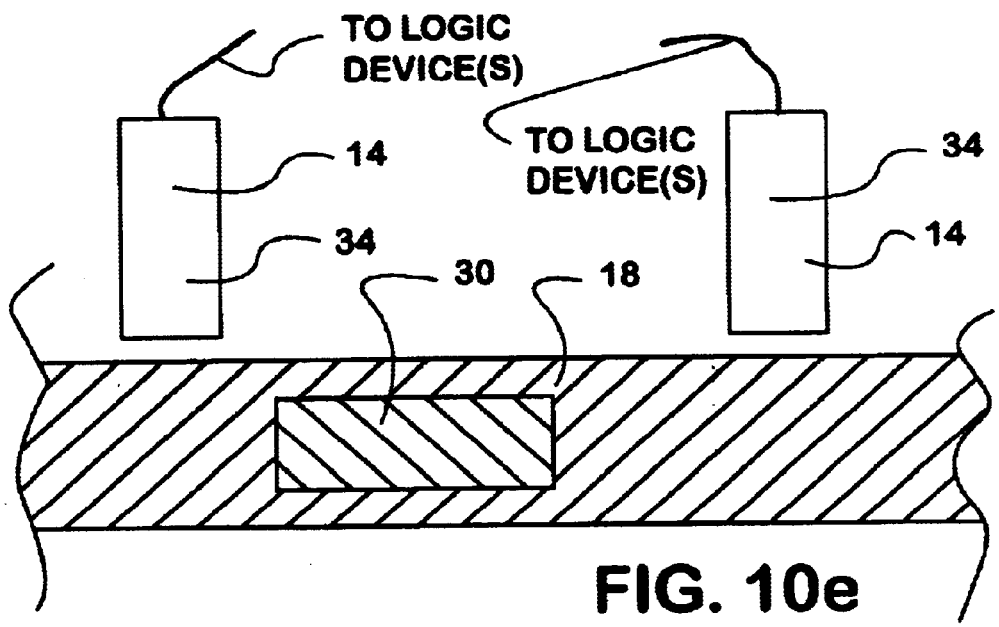
Figure 10C:
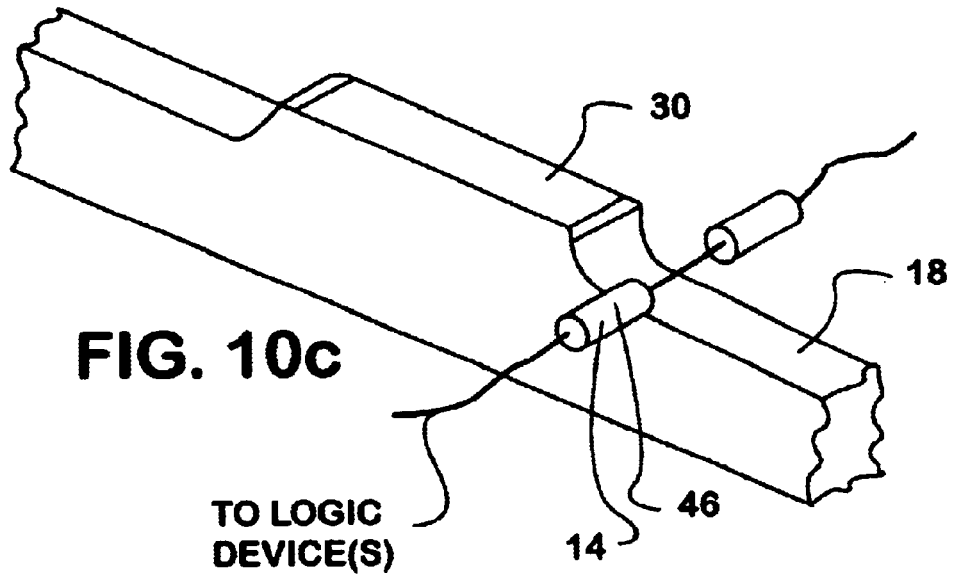

FIG. 10c is a view of a park-brake-actuating component that is configured for linear motion during actuation and retraction and that has a single position-marking structure attached to it and adjacent which a single actual-state sensor that is a photo-sensitive device is positioned.

FIG. 10d is a view of a park-brake-actuating component that is configured for linear motion during actuation and retraction and that has two position-marking structures that are constructed of ferrous material attached to it and adjacent which a single actual-state sensor that is a hall-effect sensor is mounted.

FIG. 10e is a view of a park-brake-actuating component that is configured for linear motion during actuation and retraction and that has a single position-marking structure that is constructed of a ferrous material attached to it and adjacent which two actual-state sensors that are hall-effect sensors are positioned.

Figure 10F:
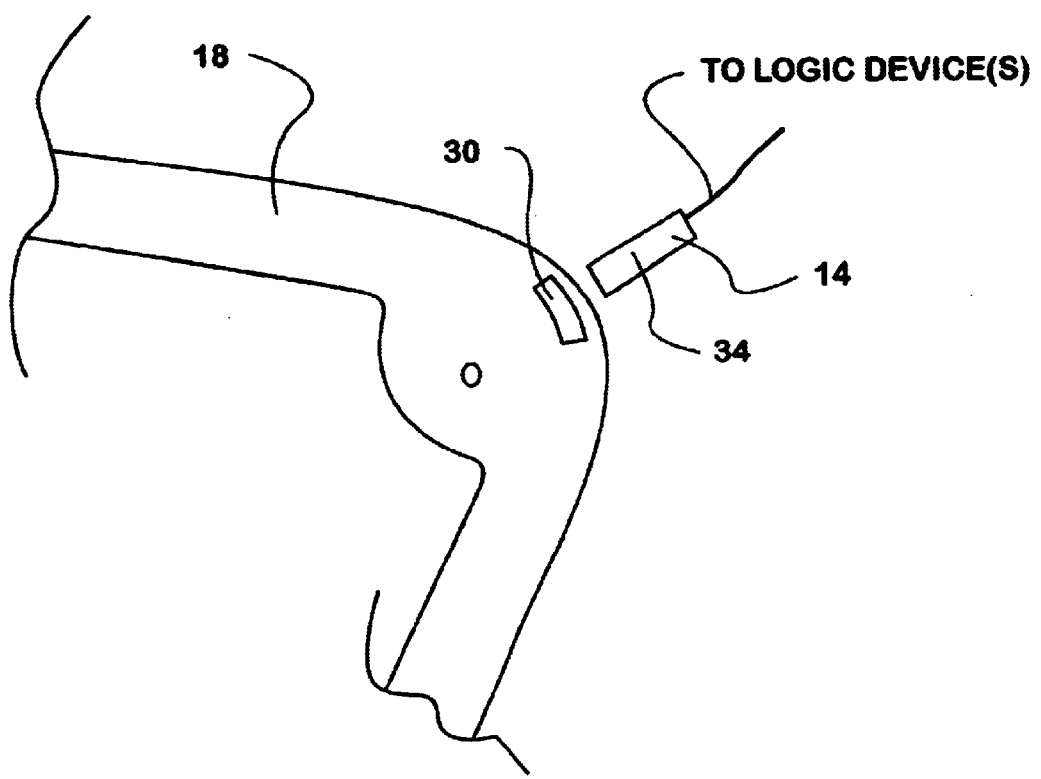

FIG. 10f is a view of a park-brake-actuating component that is configured for rotational movement during actuation and retraction and that has a single position-marking structure that is constructed of ferrous material mounted to it and adjacent which is positioned a single actual-state sensor that is a hall-effect sensor.

FIG. 10g is a view of a park-brake-actuating component that is configured for linear movement during actuation and retraction and to which a single actual-state sensor that is a potentiometer is attached.

Figure 1:
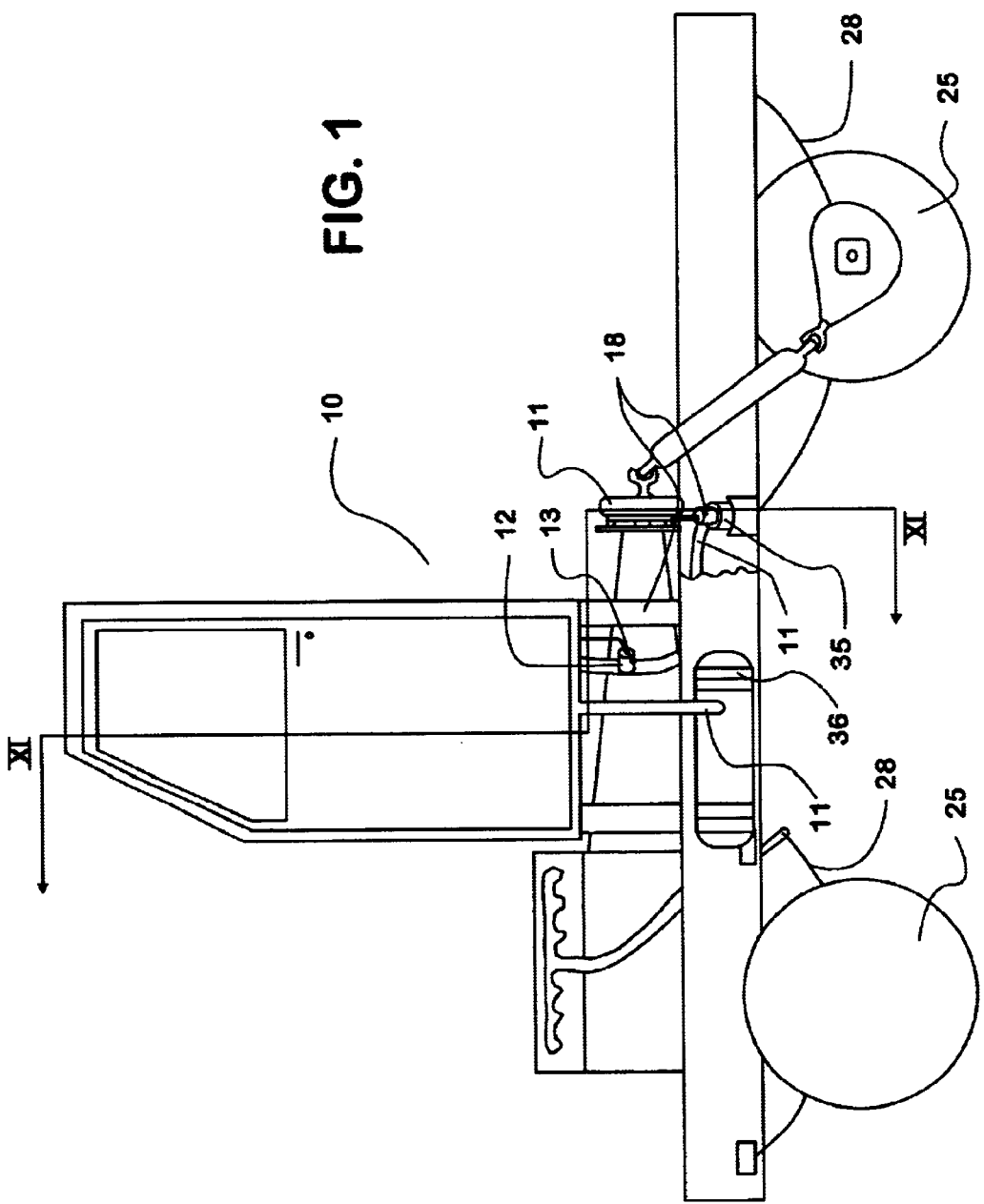
FIG. 1 is a side elevation view of a vehicle that includes an embodiment of a park-brake monitoring-system according to the present invention.
Figure 11A:
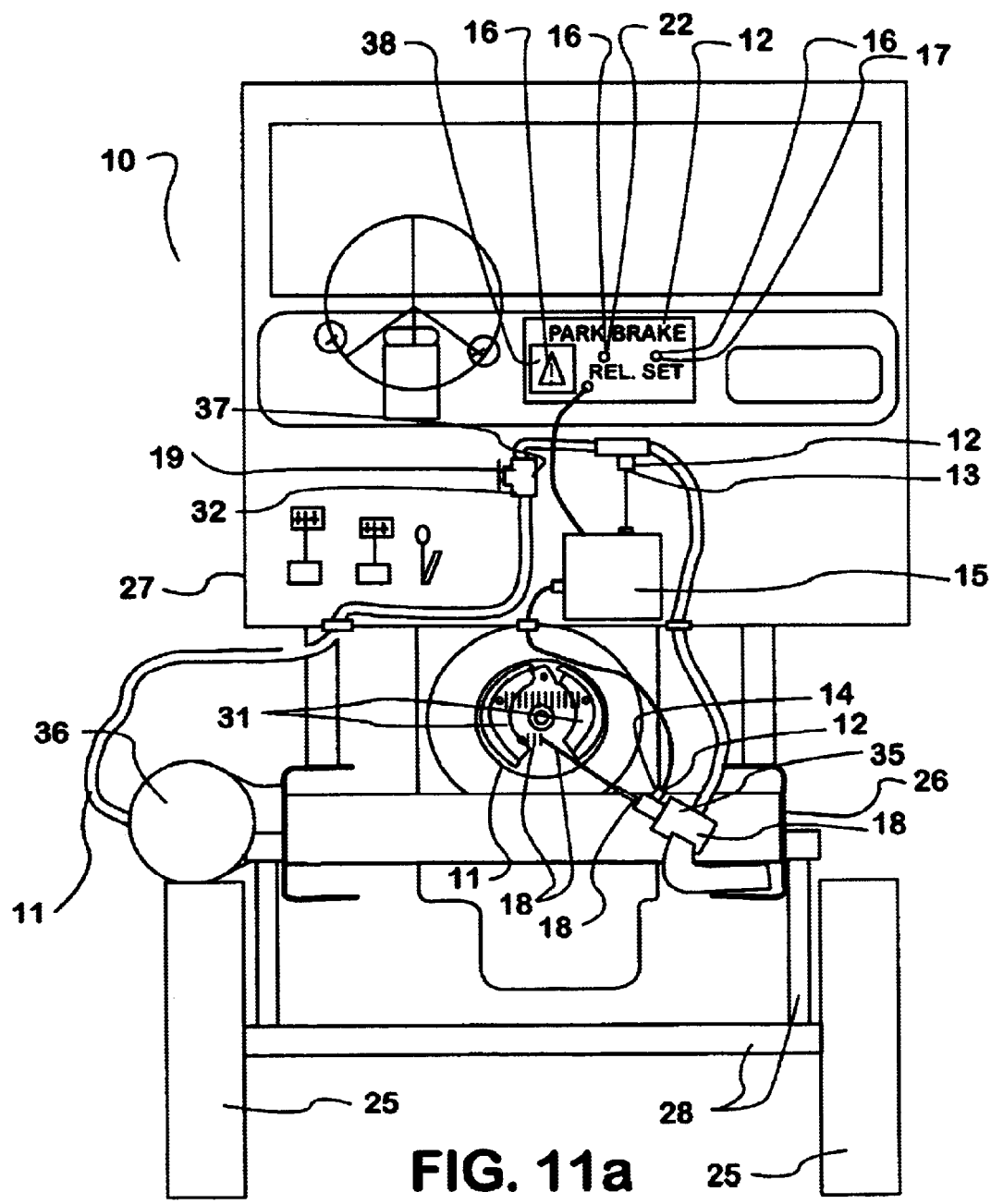

FIG. 11a is a sectional view of the vehicle shown in FIG. 1 through line XI—XI showing the park-brake system in a released operational state with the park-brake-actuating components thereof disposed within their under-travel range of positions.

Figure 11B:
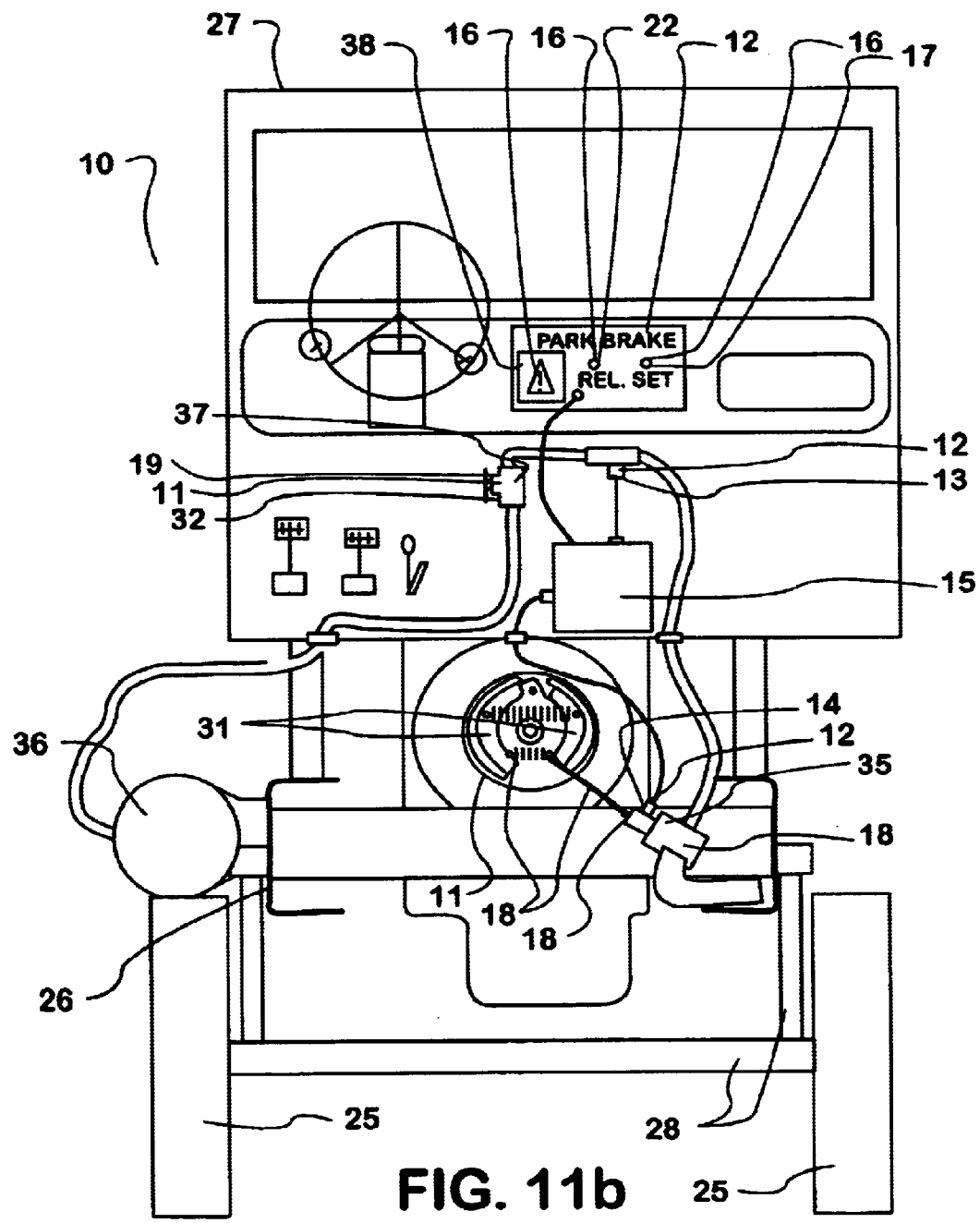

FIG. 11b is a sectional view of the vehicle shown in FIG. 1 through line XI—XI showing the park-brake system in a set operational state with the park-brake-actuating components thereof disposed within their full-travel range of positions.

Figure 11C:
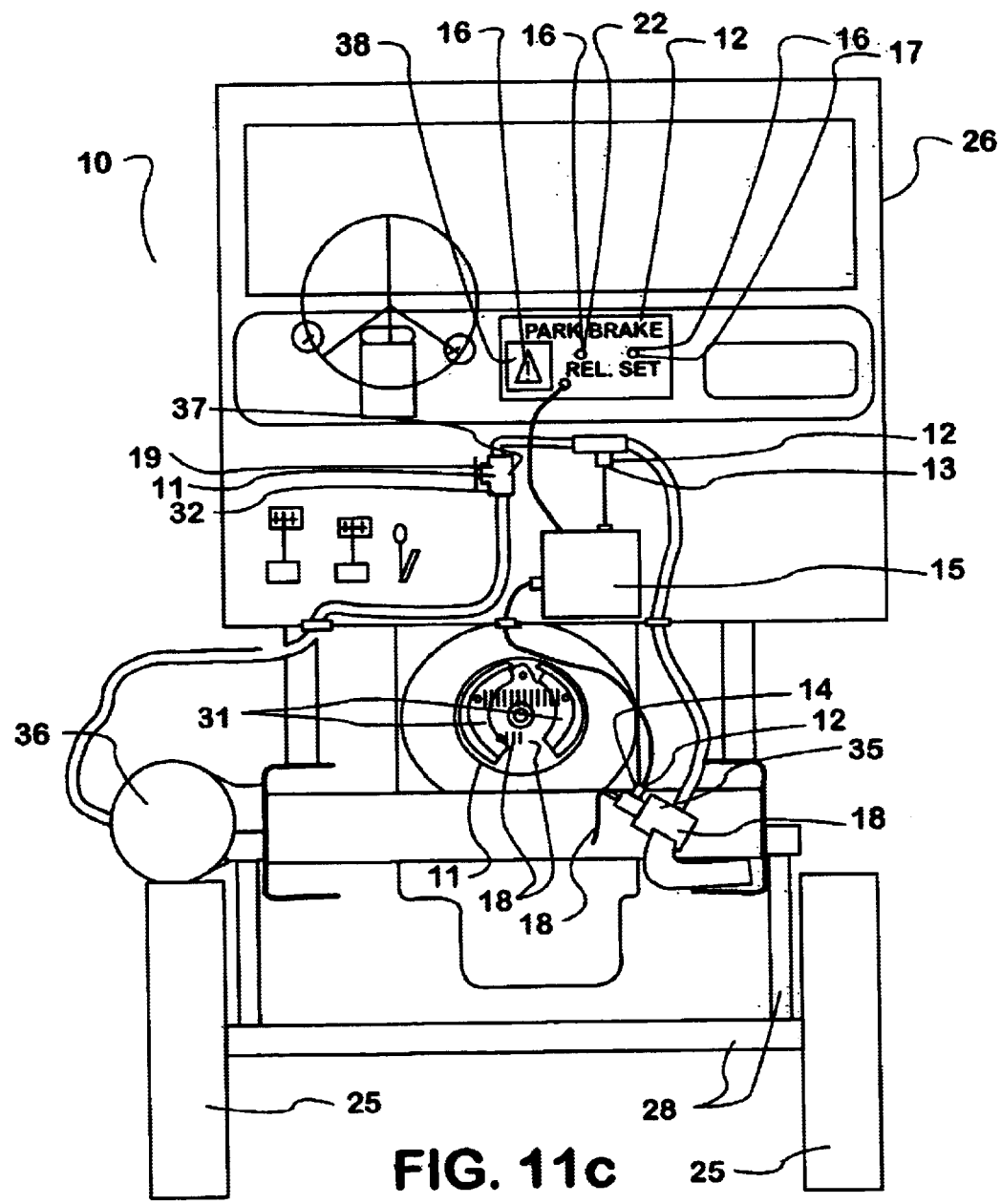

FIG. 11c is a sectional view of the vehicle shown in FIG. 1 through line XI—XI showing the park-brake system with a failed park-brake-actuator component and with those park-brake-actuating components, the position of which are sensed by the actual-state sensor of the park-brake monitoring-system, disposed within their over-travel range of positions.

DETAILS OF INVENTION

The present invention is a park-brake monitoring-system 12 for monitoring the operational state of a park-brake system 11 of a vehicle 10 and/or monitoring the park-brake system 11 of the vehicle 10 and the park-brake monitoring-system 12 itself for malfunctions. FIGS. 1, 11a, 11b, and 11c illustrate a vehicle 10 with a park-brake system 11 and a park-brake monitoring-system 12 in accordance with the present invention. A vehicle 10 according to the present invention includes one or more frame structure(s) 26 to which a majority of other components of the vehicle 10 are engaged directly or indirectly and which serve to locate the other components of the vehicle 10 relative to one another. Additionally, a vehicle 10 according to the present invention includes a suspension system 28 to which the one or more frame structures 26 of the vehicle 10 are engaged, and from which, the one or more frame structures 26 derive support. The suspension system 28 of a vehicle 10 according to the present invention includes one or more ground-engaging components 25. As mentioned above, a vehicle 10 according to the present invention includes a park-brake system 11. The function of the park-brake system 11 is to selectively allow or prevent movement of the vehicle 10 along the ground dependent upon the operational state of the park-brake system 11. One or more of the ground-engaging components 25 of a vehicle 10 according to the present invention are engaged to the frame structure(s) 26 thereof in such a manner that, when the park-brake system 11 has a released operational state, those ground-engaging components 25 can rotate relative to the frame structure(s) 26 and the ground, thus, providing for easy movement of the vehicle 10 over the ground as the ground-engaging components 25 roll over the ground. The park-brake system 11 is constructed and engaged to the vehicle 10 in such a manner that, when the park-brake system 11 has a set operational state, the park-brake system 11 is engaged between one or more of the ground-engaging components 25 and the frame structure(s) 26 of the vehicle 10 in such a manner to prevent relative rotation therebetween and to, thus, prevent movement of the vehicle 10 along the ground. Thus, when an operator of the vehicle 10 wishes to drive the vehicle 10, they effect a released operational state of the park-brake system 11 to allow movement of the vehicle 10 along the ground and, when the operator of the vehicle 10 wishes to leave the vehicle 10 unattended, they can effect a set operational state of the park-brake system 11 to prevent inadvertent, undesirable movement of the vehicle 10 along the ground.

A vehicle 10 and a park-brake system 11 thereof in accordance with the present invention may be constructed and engaged to one another in any of a number of ways that are well-known to and/or easily imaginable by one of ordinary skill in the art and that would effect functionality of the park-brake system 11 and the vehicle 10 as described above. A park-brake system 11 according to the present invention comprises braking components 31 that are mounted directly or indirectly to the frame structure(s) 26 of the vehicle 10 or the ground-engaging components 25 of the vehicle 10. The braking components 31 that a park-brake system 11 comprises may be one and the same as braking components of a service-brake system of the vehicle 10 or they may alternatively be separate and distinct from the service-brake system of the vehicle 10. The service-brake system of a vehicle being the first-choice braking-system for slowing a vehicle 10 in motion and the park-brake system 11 of a vehicle being intended for use in preventing movement of a stationary vehicle 10 and to slow a vehicle 10 in motion only when the service-brake system has failed. When a park-brake system 11 according to the present invention has a released operational state, the braking components 31 thereof are disengaged from whichever of the frame structure(s) 26 and the ground-engaging components 25 they are not mounted to, thus allowing rotation of the ground-engaging components 25 relative to the frame structure and movement of the vehicle 10 along the ground. In order to effect a set operational state of a park-brake system 11 according to the present invention, the braking components 31 thereof must be moved to a position in which they are engaged to both the frame structure(s) 26 and the ground-engaging components 25 in such a manner preventing relative rotation therebetween, and thus movement of the vehicle 10 along the ground. Park-brake systems 11 according to the present invention include one or more park brake-actuating component(s) 18 that are engaged to the braking components 31 in such a manner that the park-brake-actuating component(s) 18 can be actuated in order to move the braking components 31 of the park-brake system 11 from the position(s) they occupy when the park-brake system 11 has a released operational state to the positions they occupy when the park-brake system 11 has a set operational state. The park-brake-actuating component(s) 18 can further be retracted to allow or effect movement of the braking component(s) 31 of the park-brake system 11 from the position(s) they occupy when the park-brake system 11 has a set operational state to the position(s) they occupy when the park-brake system 11 has a released operational state. A park-brake system 11 according to the present invention further includes park-brake-system controls 19 that are useable by an operator of the vehicle 10 to control actuation and retraction of the park-brake-actuating components 18 and, thus, the operational state of the park-brake system 11. It will also be understood that part or all of a park-brake monitoring-system 12 according to the present invention may be part of the park-brake-system controls 19 of the park-brake system 11 that it monitors.

The park-brake monitoring-system 12 of the present invention includes one or more selected-state sensor(s) 13 and one or more actual-state sensor(s) 14. The park-brake monitoring-system 12 of the present invention also includes one or more logic device(s) 15, which are communicatively linked with both the selected-state sensor(s) 13 and the actual-state sensor(s) 14 of the park-brake monitoring-system 12. The selected-state sensor(s) 13 of the park-brake monitoring-system 12 interact with the park-brake-system controls 19 of the park-brake system 11 and produce and communicate to the logic device(s) 15 signals that are implicative of a requested operational state of the park-brake system 12. The actual-state sensor(s) 14 of the park-brake monitoring-system 12 interact with the park-brake-actuating components 18 of the park-brake system 11 and produce and communicate to the logic device(s) 15 signals that are implicative of an actual operational state of the park-brake system 11. The logic device(s) 15 of the park-brake monitoring-system 12 operate according to logic to produce monitoring signals that are dependent upon both the signals received from the selected-state sensor(s) 13 and the actual-state sensor(s) 14. The monitoring signals produced by the logic device(s) 15 of the park-brake monitoring-system 12 include signals indicative of an operational state of the park-brake system 11 and/or error signals that indicate that the park-brake system 11 and/or the park-brake monitoring-system 12 is malfunctioning. The monitoring signals produced by the logic device(s) 15 of a park-brake monitoring-system 12 may exist in any of a number of signal-relaying mediums including electricity. The monitoring signals produced by the logic device(s) 15 of a park-brake monitoring-system 12 according to the present invention may be communicated from one portion of the logic device(s) 15 to another portion of the logic device(s) 15 in order to effect operation of the logic device(s) 15 in a manner appropriate for the circumstances that the monitoring signals are implicative of. Additionally or alternatively the monitoring signals produced by a park-brake monitoring-system 12 according to the present invention may be communicated to other components and/or systems of the vehicle 10 and/or of other device(s) such as vehicle maintenance device(s) in order to effect operation of those components, systems, and/or device(s) in a manner appropriate for the circumstances that the monitoring signals are implicative of.

The selected-state sensor(s) 13 and their interaction with the park-brake-system controls 19 and the logic device(s) 15 may be of any of a number of designs that are well-known to and/or easily imaginable by a person of ordinary skill in the art and that cause the selected-state sensor(s) 13 to produce and communicate to the logic device(s) 15 signals that are implicative of operator intent for the operational state of the park brake-system 11. Park-brake-system controls 19 include an operator interface 32 operable by an operator to select either the set operational state or the released operational state of the park-brake system 11. In the traditional sense an operator of the park-brake system 11 is generally a person that utilizes the operator interface 32. It will of course be understood, however, that in many cases, the operator of a park-brake system 11 is a logical device (which may or may not be one of the one or more logical device(s) 15 of the park-brake monitoring-system 12) that automatically controls the operational state of the park-brake system 11 based upon, for instance, the operational state of other systems of the vehicle 10. For a given assembly of park-brake-system controls 19 that is functioning properly there are a number of conditions that exist only when an operator thereof has utilized the operator interface 32 to select a released operational state of the park-brake system 11. These conditions may include, but are not limited to certain positions of components of the park-brake-system controls 19, certain fluid pressures within chambers of components of the park-brake-system controls 19, and certain voltages within portions of electrical circuits of the park-brake-system controls 19. A park-brake monitoring-system 12 according to the present invention comprises one or more selected-state sensor(s) 13 that interact with the park-brake-system controls 19 in such a manner that the selected-state sensor(s) 13 produce and communicate to the logic device(s) 15 a release-requested signal, during and only during the existence of one or more of the conditions that are only present in the park-brake-system controls 19 when an operator has utilized the operator interface 32 to select a released operational state of the park-brake system 11. By so communicating a release-requested signal to the logic device(s) 15, the selected-state sensor(s) 13 enable operation of the logic device(s) 15 in a manner appropriate for circumstance(s) in which an operator has selected a released operational state of the park-brake system 11, which circumstances are implied by the conditions that drive the communication to the logic device(s) 15 of a set-requested signal, and thus, by the communication of the release-requested signal. For a given assembly of park-brake-system controls 19 that is functioning properly there are a number of conditions that exist only when an operator thereof has utilized the operator interface 32 to select a set operational state of the park-brake system 11. These conditions may include, but are not limited to certain positions of components of the park-brake-system controls 19, certain fluid pressures within chambers of components of the park-brake-system controls 19, and certain voltages within portions of electrical circuits of the park-brake-system controls 19. The selected-state sensor(s) 13 of a park-brake monitoring-system 12 according to the present invention further interact with the park-brake-system controls 19 in such a manner that the selected-state sensor(s) 13 produce and communicate to the logic device(s) 15 a set-requested signal, during and only during the existence of one or more of the conditions that are only present in the park-brake-system controls 19 when an operator has utilized the operator interface 32 to select a set operational state of the park-brake system 11. By so communicating a set-requested signal to the logic device(s) 15, the selected-state sensor(s) 13 enable operation of the logic device(s) 15 in a manner appropriate for circumstance(s) in which an operator has selected a set operational state of the park-brake system 11, which circumstances are implied by the conditions that drive the communication to the logic device(s) 15 of a set-requested signal and, thus, by the communication to the logic device(s) 15 of a set-requested signal. The selected-state sensor(s) 13 that produce set-requested signals and those that produce the release-requested signals may be one and the same components or separate and distinct components. It is anticipated that future park-brake monitoring-systems 12 according to the present invention may be configured in such a manner that the selected-state sensor(s) 13 produce and communicate to the logic device(s) 15 multiple different types of set-requested and/or multiple different types of release-requested signals during various operating circumstances of the park-brake monitoring-system 12. For example, some park-brake systems 11 may have park-brake-system controls 19 that allow for both automatic and manual selection of the operational state of the park-brake system 12. A park-brake monitoring-system 12 in accordance with the present invention and monitoring such a park-brake system 12, which enables both automatic and manual selection of the operational state of the park-brake system 11, may be configured in such a manner that the selected-state sensor(s) 13 thereof produce and communicate to the logic device(s) 15 a manual set-requested sign when a set operational state of the park-brake system 11 has been manually selected and the selected-state sensor(s) 13 produce and communicate to the logic device(s) 15 an automatic set-requested signal when a set operational state of the park-brake system 11 has been automatically selected. It is further anticipated that future park-brake monitoring-systems 12 according to the present invention may be configured in such a manner that, in addition to producing and communicating to the logic device(s) 15 set-requested signals and release-requested signals, the selected-state sensor(s) 13 thereof will produce and communicate to the logic device(s) 15 signals that cannot be classified as a set-requested signal or a release-requested signal. It will be understood that a park-brake monitoring-system 12 is considered to be in accordance with the present invention, whether or not the selected-state sensor(s) 13 produce and communicate to the logic device(s) 15 multiple types of set-requested signals, multiple types of release-requested signals, and/or signals that cannot be classified as set-requested signals or release-requested signals, as long as the park-brake monitoring-system 12 utilizes at least one type of set-requested signal and at least one type of release-requested signal as described in this disclosure and the park-brake monitoring-system 12 is otherwise in accordance with the teachings of this disclosure. The selected-state sensor(s) 13 of the park-brake monitoring-system 12 may comprise devices including, but not limited to, switches, transducers, potentiometers, hall-effect sensors, pressure sensors, and photosensitive device(s). The selected-state sensor(s) 13 may also include or consist of simple conductive components that communicate voltage signals from electrical circuits of the park-brake-system controls 19 to the logic device(s) 15 of the park-brake monitoring-system 12. The selected-state sensor(s) 13 may also include or consist of simple conductive components that communicate pressure signals from fluid circuits of the park-brake-system controls 19 to the logic device(s) 15 of the park-brake monitoring-system 12. The selected-state sensor(s) 13 may also include or consist of simple conductive components that communicate light signals from fiber-optic circuits of the park-brake-system controls 19 to the logic device(s) 15 of the park-brake monitoring-system 12.

It will also be understood that in some cases a lack of a signal is, in fact, a signal. For example, the logical device(s) 15 and the logic according to which they operate may be configured in such a manner that, when the logical device(s) 15 receive zero voltage from a sensor that produces electrical voltage signals, the logical device(s) 15 interpret the zero voltage input as a signal and perform different actions than they would if they received a non-zero voltage input from the sensor that produces electrical voltage signals. In an analogous manner communication by a sensor to a logic device of a zero quantum any signal-relaying means including pressure, light, and sound may be considered to be a communication of a signal in any case where the logic device and the logic according to which it operates are configured in such a manner that the logic device functions differently upon the receipt of the zero quantum of the signal-relaying means than it does upon the receipt of a non-zero quantum of the signal-relaying means.

Because, in some circumstances a lack of a signal is effectively a signal, the conditions that must be met in order for it to be considered that the selected-state sensor(s) 13 have communicated a set-requested signal or a release-requested signal to the logic device(s) 15 will be outlined now. For a signal communicated to the logic device(s) 15 to be considered a set-requested signal, the signal must be a signal from the selected-state sensor(s) 13 and must be discernable by the logic device(s) 15 from any signal that the selected-state sensor(s) 13 would communicate to the logic device(s) 15 when an operator has not utilized the operator interface 32 to select a set operational state of the park-brake system 11. For a signal communicated to the logic device(s) 15 to be considered a release-requested signal, the signal must be a signal from the selected-state sensor(s) 13 and must be discernable by the logic device(s) 15 from any signal that the selected-state sensor(s) 13 would communicate to the logic device(s) 15 when an operator has not utilized the operator interface 32 to select a released operational state of the park-brake system 11. It will be understood that there are a number of different ways in which to ensure that one signal is discernable from another by the logic device(s) 15. One way to make two signals discernable from one another by the logic device(s) 15 is to give them different values. Another way to make two signals discernable from one another by the logic device(s) 15 is to separate their communication to the logic device(s) in space, such as by inputting the signals to different electrical inputs of the logical device(s) 15. Yet another way to make two signals discernable from one another by the logic device(s) 15 is to separate their communication to the logic device(s) in time, such as is commonly done with multiplexed electrical systems like the one disclosed in U.S. Pat. No. 4,809,177 to Navistar International Transportation Corp. It is further contemplated that a person of ordinary skill in the art is apprised of and/or could easily imagine other ways of making two signals, such as a set-requested signal and a release-requested signal, discernable from one another by the logic device(s) 15 of the park-brake monitoring-system 12.

In some embodiments of the present invention, such as the embodiment shown in FIGS. 11*a*, 11*b*, and 11*c*, the park-brake monitoring-system 12 comprises a single selected-state sensor 13 that is a pressure-activated switch. In some of these embodiments, the park-brake-actuating components 18 of the park-brake system 11 include a powered actuator 35 that provides the power to actuate and retract the other park-brake-actuating component(s) 18 of the park-brake system 11. In some of these embodiments, the powered actuator 35 utilizes pressurized air, which is received from a pressurized-air reservoir 36 on the vehicle 10, to retract the other park-brake-actuating components 18 of the park-brake system 11 and to, thus, effect a released operational state of the park-brake system 11 when an operator has selected a released operational state of the park-brake system 11. In those embodiments the park-brake-system controls 19 include plumbing that extends between and is in fluid communication with both the powered actuator 35 and the pressurized-air reservoir 36. Some of these embodiments of the present invention further include flow-control components that allow the delivery of pressurized air through the plumbing, which extends between the pressurized-air reservoir 36 and the powered actuator 35, to the powered actuator 35, when an operator has utilized the operator interface 32 of the park-brake-system controls 19 to select a released operational state of the park-brake system 11. In these embodiments the flow-control components also cause isolation of the powered actuator 35 from the pressurized-air reservoir 36 and venting of any pressurized air in the powered actuator 35, when an operator has utilized the operator interface 32 of the park-brake-system controls 19 to select a set operational state of the park-brake system 11. The pressure-activated switch that is the selected-state sensor 13 of the these embodiments has its pressure diaphragm disposed within a portion of the plumbing that extends between the pressurized-air reservoir 36 and the powered actuator 35 and that is pressurized when an operator has utilized the operator interface 32 to select a released operational state of the park-brake system 11 and that is depressurized when an operator has selected a set operational state of the park-brake system 11. When an operator has utilized the operator interface 32 to select a released operational state of the park-brake system 11 the pressure within the plumbing that the diaphragm of the pressure-activated switch that constitutes the selected-state sensor 13 is disposed in, effects a closed operational state of the pressure-activated switch that is the selected-state sensor 13 of these embodiments, and the selected-state sensor 13 produces and communicates to the logic device(s) 15 a logic high (binary-digital 1) signal. When an operator has utilized the operator interface 32 to select a set operational state of the park-brake system 11, the lack of pressure, within the plumbing that the diaphragm of the selected-state sensor 13 of these embodiments is disposed in, allows the pressure-activated switch that is the selected-state sensor 13 to assume its default open operational state and the selected-state sensor 13 produces and communicates to the logic device(s) a logic low (binary-digital 0) signal. Thus, in these embodiments a communication of a logic low (binary-digital 0) signal to the logic device(s) 15 is implicative that a released operational state of the park-brake system 11 has been selected and is, thus a communication to the logic device(s) 15 of a release-requested signal and a communication of a logic high (binary-digital 1) signal to the logic device(s) 15 is implicative that a set operational state of the park-brake system 11 has been selected and is, thus, a communication to the logic device(s) 15 of set-requested signal.

There are many different ways that are well-known to and/or easily imaginable by one of ordinary skill in the art that the park-brake-actuating component(s) 18, the braking components 31, and the park-brake-system controls 19 of a park-brake system 11 according to the present invention may be constructed and interacted with one another. Each of the park-brake-actuating component(s) 18 has a home position that it is disposed in when the park-brake system 11 has a released operational state. FIG. 11a is illustrative of a park-brake system 11 that has a released operational state and that, thus, has its park-brake-actuating components 18 disposed in their respective home positions. Each of the park-brake-actuating components 18 also has a set position that it is disposed in when the park-brake system 11 has a set operational state. FIG. 11b is illustrative of a park-brake system 11 that has a set operational state and that, thus, has its park-brake-actuating components 18 disposed in their respective set positions. When the park-brake system 11 has a released operational state and an operator of the park-brake system 11 utilizes the operator interface 32 to change the selected operational state to set, the park-brake-system controls 19 cause actuation of the park-brake-actuating component(s) 18 from their home position(s) through intermediate positions to their set position(s). When, the park-brake system 11 has a set operational state and an operator of the park-brake system 11 utilizes the operator interface 32 to change the selected operational state to released, the park-brake-system controls 19 cause or allow retraction of the park-brake-actuating component(s) 18 from their set position through intermediate positions to their home positions.

The actual-state sensor(s) 14 of a park-brake monitoring-system 12 according to the present invention produce and communicate to the logic device(s) 15 signals that are implicative of the actual operational state of the park-brake system 11. The signals that the actual-state sensor(s) 14 produce that are implicative of the actual operational state of the park-brake system 11 are dependent upon the position of one or more of the park-brake-actuating component(s) 18 relative to their home and set positions. Three different signals that can be produced by the actual-state sensor(s) 14 and communicated to the logic device(s) 15 include an under-travel signal, a full-travel signal, and an over-travel-signal. An under-travel signal produced by the actual-state sensor(s) 14 and communicated to the logic device(s) 15 is, by definition, a signal that is produced and communicated to the logic device(s) 15 by the actual-state sensor(s) 14 when the park-brake-actuating component(s) 18 are actuated and/or retracted to positions within their under-travel range of positions. A full-travel signal produced by the actual-state sensor(s) 14 and communicated to the logic device(s) 15 is, by definition, a signal that is produced and communicated to the logic device(s) 15 by the actual-state sensor(s) 14 when the park-brake-actuating component(s) 18 are actuated to positions within their full-travel range of positions. An over-travel signal produced by the actual-state sensor(s) 14 and communicated to the logic device(s) 15 is, by definition, a signal that is produced and communicated to the logic device(s) 15 by the actual-state sensor(s) 14 when the park-brake-actuating component(s) 18 are actuated to positions within an over-travel range of positions. The full-travel range of positions for a given park-brake-actuator component 18 is a range of positions that encompasses a range of positions within which it is judged that the set position of the given park-brake-actuator component 18 will exist in any one of the varying sets of circumstances that may be present during proper functioning of the park-brake system 11. It will be understood that the set position of each of the park-brake-actuating component(s) 18 may change with changing circumstances that include but are not limited to such things as wear level of the braking components 31, structural relaxation of the park-brake-actuating components 18, and size of park-brake-actuating component(s) 18 as a result of thermal expansion and contraction. The under-travel range of positions for a given park-brake-actuating component 18 is a range of positions between its home position and its full-travel range of positions. The over-travel range of positions for a given park-brake-actuating component 18 is a range of positions all of which are disposed farther from the home position of the park-brake-actuating component 18 than the full-travel range of positions thereof. The park-brake-actuating components 18 are only disposed within their over-travel range of positions when the park-brake-system 11 malfunctions due to failure of components of the park-brake system 11 or maladjustment of the park-brake system 11. The bounds of an under-travel range of positions, a full-travel range of positions, and an over-travel range of positions are specific to each park-brake-actuating component of each of many different constructions of park-brake system 11. The bounds of the full-travel range of positions for a given park-brake-actuating component 18 can be easily determined by one of ordinary skill in the art by simply determining the range of positions within which the set position of the park-brake-actuating component 18 could exist under acceptable circumstances of operation of the park-brake system 11 and defining the outer bounds of the full-travel range of positions to at least encompass said range of positions within which the set position of the park-brake-actuating component 18 could exist under acceptable circumstances of operation of the park-brake system 11, but not the home position of the park-brake-actuating component 18. Once the bounds of the full-travel range of positions are determined, the bounds of the under-travel range of positions and the over-travel range are also effectively determined. The bounds of the under-travel range of positions simply being the home position and the bound of the full-travel range of positions that is nearest the home position. The over-travel range of positions being bounded between the bound of the full-travel range of positions farthest from the home position and any desirable position that is farther from the home position than the bound of the full-travel range of positions that is farthest from the home position. Because under-travel signals are only produced and communicated to the logic device(s) 15 when the park-brake-actuating component(s) 18 are in positions between their home and set positions, the production and communication to the logic device(s) 15 of an under-travel signal by the actual-state sensor(s) 14 is implicative that the park-brake system 11 has a released operational state. Because full-travel signals are only produced and communicated to the logic device(s) 15 when the park-brake-actuating component(s) 18 are in positions within a range that their set position(s) are likely to exist in, the production and communication to the logic device(s) 15 of a full-travel signal by the actual-state sensor(s) 14 is implicative that the park-brake system 11 has a set operational state. Because over-travel signals are only produced and communicated to the logic device(s) 15 when the park-brake-actuating component(s) 18 are in positions further from their home position than their set position, the production and communication to the logic device(s) 15 of an over-travel signal by the actual-state sensor(s) 14 is implicative that the park-brake system 11 does not have a set operational state. A park-brake monitoring-system 12 according to the present invention is configured in such a manner that the actual-state sensor(s) 14 thereof function to perform at least one of, but not necessarily more than one of the tasks of, producing and communicating to the logic device(s) 15 an under-travel signal when the park-brake-actuating component(s) 18 are within at least some portion their under-travel range of positions, producing and communicating to the logic device(s) 15 a full-travel signal when the park-brake-actuating component(s) 18 are in at least some portion of their full-travel range of positions, and producing and communicating to the logic device(s) 15 an over-travel signal when the park-brake-actuating component(s) 18 are in at least some portion of their over-travel range of positions. In some embodiments of the present invention the actual-state sensor(s) 14 perform all three functions of producing and communicating to the logic device(s) 15 an under-travel signal when one or more of the park-brake-actuating component(s) 18 have positions in at least some portion of their under-travel range of positions, producing and communicating to the logic device(s) 15 a full-travel signal when one or more of the park-brake-actuating component(s) 18 are in at least some portion of their full-travel range of positions, and producing and communicating to the logic device(s) 15 an over-travel signal when one or more of the park-brake-actuating component(s) 18 are in at least some portion of their over-travel range of positions. In some embodiments the actual-state sensor(s) 14 produce and communicate to the logic device(s) 15 an under-travel signal when the park-brake-actuating component(s) 18 are disposed within any portion of its/their under-travel range of positions. As a result of design constraints it may be the case, however, that a park-brake monitoring-system 12 according to the present invention is configured in such a manner that the actual-state sensor(s) 14 only produce and communicate to the logic device(s) 15 an under-travel signal when the park-brake-actuating component(s) 18 are in certain positions which are a subset of its/their under-travel range of positions. In some embodiments the actual-state sensor(s) 14 produce and communicate to the logic device(s) 15 a full-travel signal when the park-brake-actuating component(s) 18 are disposed within any portion of its/their full-travel range of positions. As a result of design constraints it may be the case, however, that a park-brake monitoring-system 12 according to the present invention is configured in such a manner that the actual-state sensor(s) 14 only produce and communicate to the logic device(s) 15 a full-travel signal when the park-brake-actuating component(s) 18 are in certain positions that are a subset of its/their full-travel range of positions. In some embodiments the actual-state sensor(s) 14 produce and communicate to the logic device(s) 15 an over-travel signal when the park-brake-actuating component(s) 18 are disposed within any portion of its/their over-travel range of positions. As a result of design constraints it may be the case, however, that a park-brake monitoring-system 12 according to the present invention is configured in such a manner that the actual-state sensor(s) 14 only produce and communicate to the logic device(s) 15 an over-travel signal when the park-brake-actuating component(s) 18 are in certain positions that are a subset of its/their over-travel range of positions.

It should be clarified that some of the park-brake-actuating components 18 of a park-brake system 11 according to the present invention may be considered to be part of the park-brake-system controls 19 as they are discussed in this disclosure. For purposes of this disclosure, a given park-brake-actuating component 18 is considered to be part of the park-brake-system controls 19 relative to each of the park-brake-actuating components 18 that are disposed in the series of park-brake-actuating components 18 between the given park-brake-actuating component 18 and the braking components 31 of the park-brake system 11. In other words a given park-brake-actuating component 18 is considered to be part of the park-brake-system controls 19 relative to park-brake-actuating component(s) 18 that it is upstream of. State in yet another way, a given park-brake-actuating component 18 is considered to be part of the park-brake-system controls 19 relative to those park-brake-actuating component(s) 18 that the given park-brake-actuating component 18 actuates. Thus, a park-brake monitoring-system 12 according to the present invention may have one or more actual-state sensor(s) 14 that produce and communicate to the logic device(s) 15 signals dependent upon the position of one or more park-brake-actuating component(s) 18. The same park-brake monitoring-system 12 may also have one or more selected-state sensor(s) 13 that produce and communicate to the logic device(s) 15 signals dependent upon conditions present in one or more of the park-brake-actuating component(s) 18 that are considered to be part of the park-brake-system controls 19 by virtue of being upstream of the park-brake-actuating component(s) 18, upon the position(s) of which, the signals produced and communicated to the logic device(s) 15 by the actual-state sensor(s) 14 are dependent.

It is anticipated that future park-brake monitoring-systems 12 in accordance with the present invention may be configured in such a manner that the actual-state sensor(s) 14 may produce and communicate to the logic device(s) 15 signals that are more specific than those signals described above and/or related to other aspects of the operational state of a park-brake system 11 monitored by the park-brake monitoring-system 12 in addition to those signals described above. Future park-brake monitoring-systems 12 in accordance with this invention may be configured in such a manner that the actual-state sensor(s) 14 produce and communicate to the logic device(s) 15 multiple types of under-travel signals, multiple types of full-travel signals, and/or multiple types of over-travel signals during operation of the park-brake monitoring-system. For example, a park-brake monitoring-system 12 may be configured in such a manner that, during operation of the park-brake monitoring-system 12, the actual-state sensor(s) 14 can produce and communicate to the logic device(s) 15 multiple different types of full-travel signals, each of which is indicative of the existence of the park-brake-actuating component(s) 18 within a certain sub-portion of their full-travel range of positions and each of which is thus implicative of a state of wear of the park-brake system 11. It is additionally anticipated that future park-brake monitoring-systems 12 in accordance with the present invention may be configured in such a manner that, during operation of the park-brake monitoring-system 12 the actual-state sensor(s) 14 produce and communicate to the logic device(s) 15 other types of signals in addition to under-travel signals, full-travel signals, and/or over-travel signals. It will be understood that a park-brake monitoring-system 12 is considered to be in accordance with the present invention whether or not its actual-state sensor(s) 14 produce and communicate to its logic device(s) 15 multiple types of under-travel signals, multiple types of full-travel signals, multiple types of over-travel signals, and/or other types of signals, as long as the park-brake monitoring-system 12 utilizes at least two signals selected from a group consisting of some type of an under-travel signal, some type of a full-travel signal, and some type of an over-travel signal in accordance with the teachings of this disclosure and the park-brake monitoring-system 12 is otherwise in accordance with the teachings of this disclosure.

Because in some circumstances a lack of a signal is effectively a signal, the conditions that must be met in order for it to be considered that the actual-state sensor(s) 14 have communicated an under-travel signal, a full-travel signal, or an over-travel signal to the logic device(s) 15 will be outlined now. For a signal communicated to the logic device(s) 15 to be considered an under-travel signal, the signal must be a signal from the actual-state sensor(s) 14 and must be discernable by the logic device(s) 15 from any signal that the actual-state sensor(s) 14 would communicate to the logic device(s) 15 when the park-brake-actuator component(s) 18 are in their full-travel range of positions. For a signal communicated to the logic device(s) 15 to be considered a full-travel signal, the signal must be a signal from the actual-state sensor(s) 14 and must be discernable by the logic device(s) 15 from any signal that the actual-state sensor(s) 14 would communicate to the logic device(s) 15 when the park-brake-actuator component(s) 18 are in their under-travel range of positions and/or any signal that the actual-state sensor(s) 14 would communicate to the logic device(s) 15 when the park-brake-actuating component(s) 18 are in their over-travel range of positions. For a signal communicated to the logic device(s) 15 to be considered an over-travel signal, the signal must be a signal from the actual-state sensor(s) 14 and must be discernable by the logic device(s) 15 from any signal that the actual-state sensor(s) 14 would communicate to the logic device(s) 15 when the park-brake-actuator component(s) 18 are in their full-travel range of positions. As was outlined in greater detail above, it will be understood that there are a number of different ways in which to ensure that the communication to the logic device(s) 15 of one signal, such as an under-travel signal, is discernable from the communication to the logic device(s) 15 of another signal, such as a full-travel signal, by the logic device(s) 15.

The actual-state sensor(s) 14 of the park-brake monitoring-system 12 may be constructed and interacted with the park-brake system 11 and the other components of the park-brake monitoring-system 12 in any of a number of different ways that would effect the functioning of the actual-state sensor(s) 14 to produce and communicate to the logic device(s) 15 under-travel signals, full-travel signals, and/or over-travel signals as described above. The actual-state sensor(s) 14 may comprise some combination of switches (as is shown in FIG. 10b), transducers, potentiometers 45 (as is shown in FIG. 10g), hall-effect sensors 34 (as is shown in FIGS. 8a, 8b, 8c, 10a, 10d, 10e, and 10f), photosensitive device(s) 46 (as is shown in FIG. 10c) and/or any other sensor that can be interacted with the park-brake-actuating component(s) 18 in such a manner to produce and communicate to the logic device(s) 15 signals in a manner dependent upon the position of the park-brake-actuating component(s) 18. The signals produced and communicated to the logic device(s) 15 by the actual-state sensor(s) 14 may be digital signals the value of which is dependent upon the position of one or more of the park-brake-actuating component(s) 18. Alternatively, the signals produced and communicated to the logic device(s) 15 by the actual-state sensor(s) 14 may be analog signals that have values related to the position of one or more of the park-brake-actuating component(s) 18. The signals produced and communicated to the logic device(s) 15 by the actual-state sensor(s) 14 may even be some combination of digital and analog signals. The value of the signals produced and communicated to the logic device(s) 15 and/or the manner in which the signals are produced and communicated to the logic device(s) 15 by the actual-state sensor(s) 14 may be related to the linear position of one or more park-brake-actuating component(s) 18, as is shown in FIGS. 8a, 8b, 8c, 10a, 10b, 10c, 10d, 10e, and 10g. Additionally or alternatively the value of the signals produced and communicated to the logic device(s) 15 and the manner in which the signals are produced and communicated to the logic device(s) 15 by the actual-state sensor(s) 14 may be related to the angular position of one or more park-brake-actuating component(s) 18 as is shown in FIG. 10f. Regardless of whether the signals produced and communicated to the logic device(s) 15 by the actual-state sensor(s) 14 are digital, analog, or some combination thereof, and whether the value of the signals and/or the manner of their communication are related to the linear position, the angular position or some combination thereof of one or more of the park-brake-actuating component(s) 18 it is contemplated that a person of ordinary skill in the art could easily work out the details of how the logic device(s) 15 and the logic according to which they operate must be configured in order to discern whether a given signal received from the actual-state sensor(s) 14 is an under-travel signal, a full-travel signal, or an over-travel signal.

In some embodiments of the present invention the park-brake monitoring-system 12 comprises one or more position-marking structures 30 that are mounted to one or more of the park-brake-actuating component(s) 18 of the park-brake system 11 and that provide a feature for the actual-state sensor(s) 14 to sense the position of and to, thus, enable the actual-state sensor(s) 14 to sense the position of the park-brake actuating component(s) 18 and produce and communicate to the logic device(s) 15 under-travel signals, full-travel signals, and/or over-travel signals in the appropriate circumstances. Those embodiments of park-brake monitoring-systems 12 that comprise such position-marking structure(s) 30 also have one or more actual-state sensor(s) 14 mounted adjacent to and/or within, a path of travel of the position-marking structure(s) 30 so that they may sense the position of the position-marking structure(s) 30 at least when the position-marking structure(s) 30 are in certain positions. Various embodiments of position-marking structure(s) 30 mounted to park-brake-actuating component(s) 18 with actual-state sensor(s) 14 positioned adjacent to and/or partially within a path of travel of those position-marking structure(s) 30 are shown in FIGS. 8a, 8b, 8c, 10a, 10b, 10c, 10d, 10e, and 10f. In these embodiments the relative positions of the position-marking structure(s) 30 and one or more of the actual-state sensor(s) 14 is such that one or more of the actual-state sensor(s) 14 are aligned with one or more of the position-marking structure(s) 30 when the park-brake-actuating component(s) 18 are in certain positions. For instance, a given actual-state sensor 14 may be positioned such that, when the park-brake-actuating component(s) 18 are positioned within their under-travel range of positions the given actual-state sensor 14 is aligned with a position-marking-structure 30. In these embodiments, one or more of those actual-state sensor(s) 14 that are positioned adjacent to and/or partially within a path of travel of the position-marking structure(s) 30 are constructed and interact with the position-marking structure(s) 30 and the logic device(s) 15 in such a manner that the signals they produce and communicate to the logic device(s) 15 when they are aligned with a position-marking structure 30 are discernible by the logic device(s) 15 from the signal(s) that they produce and communicate to the logic device(s) 15 when they are not aligned with the position-marking structure 30. For instance, a given actual-state sensor 14 may produce and communicate to the logic device(s) 15 a logic low (binary-digital 0) signal, when it is aligned with a position-marking structure 30 and may produce and communicate to the logic device(s) 15 a logic high (binary-digital 1) when it is not aligned with a position-marking structure 30. In these embodiments the locations of the position-marking structure(s) 30 and one or more of the actual-state sensor(s) 14 is such that one or more of the position-marking structure(s) 30 are only aligned with one or more of the actual-state sensor(s) 14 when the park-brake-actuating component(s) 18 are disposed within certain ones of their under-travel range of positions, their full-travel range of positions, and their over-travel range of positions. For instance a position-marking structure 30 and an actual-state sensor 14 may be positioned such that they are only aligned with one another when the park-brake-actuating component(s) 18 are positioned within their under-travel range of positions. Thus, the signals that are produced and communicated to the logic device(s) 15 by a given actual-state sensor 14 when it is aligned with a position-marking structure 30 are indicative of the existence of the park-brake-actuating component(s) 18 within those of the under-travel range of positions, the full-travel range of positions, and the over-travel range of positions, within which the park-brake-actuating component(s) 18 must be in to cause alignment of the position-marking structure 30 with the actual-state sensor 14. As a result, in these embodiments, the position-marking structure(s) 30 and the actual-state sensor(s) 14 interact with one another in such a manner to cause the actual-state sensor(s) 14 to produce and communicate to the logic device(s) 15 signals that are indicative of the park-brake-actuating component(s) 18 being within certain ones of their under-travel range of positions, their full-travel range of positions, and their over-travel range of positions those signals comprising one or more of an under-travel signal, a full-travel signal, and an over-travel signal as described above.

There are a number constructions of actual-state sensor 14 and manners in which they can be interacted with position-marking structure(s) 30 and the logic device(s) 15 to effect production and communication to the logic device(s) 15 of a signal of a different value and/or in a different manner when the actual-state sensor 14 is aligned with a position-marking structure 30 than when it is not aligned with the position-marking structure 30. As is shown in FIG. 10b, the actual-state sensor 14 may be a switch that has triggering structure 33 that contacts the position-marking structure 30 and causes a change of state of the switch from open to closed or vice versa, when the position-marking structure 30 is aligned with the actual-state sensor 14. As is shown in FIG. 10c the actual-state sensor 14 may, alternatively, comprise a light-beam source that produces a light beam that is directed at a photo-sensor and may be positioned such that the position-marking structure 30 interrupts the light beam when the position-marking structure 30 is aligned with the actual-state sensor 14. As is shown in FIGS. 8a, 8b, 8c, and 10a, in some embodiments an actual-state sensor 14 is a hall-effect sensor 34 and a corresponding position-marking structure 30 is constructed of ferrous material and is surrounded by non-ferrous material of the park-brake-actuating component 18 to which the position-marking structure 30 is attached. Thus, when the position-marking structure 30 of these embodiments is aligned with the hall-effect sensor 34 that is the actual-state sensor 14 of these embodiments, the hall-effect sensor 34 produces and communicates to the logic device(s) 15 a logic low (binary-digital 0) signal and when the position-marking structure 30 is disposed upon either the first side or the second side of the hall-effect sensor 34 the hall-effect sensor 34 produces and communicates to the logic device(s) 15 a logic high (binary-digital 1) signal.

In some embodiments of the present invention the park-brake monitoring-system 12 comprises only one actual-state sensor 14 that interacts with a single position-marking structure 30. In some of these embodiments the actual-state sensor 14 is a binary-digital sensor that is mounted to the vehicle 10 adjacent to the park-brake-actuating component 18 to which the position-marking structure 30 is mounted. In some of these embodiments the actual-state sensor 14 is positioned such that, when the park-brake-actuating component 18 to which the position-marking structure 30 is mounted is within its under-travel range of positions (as is shown in FIG. 8a), the position-marking structure 30 is disposed upon a first side of the actual-state sensor 14. The position of the actual-state sensor 14 of these embodiments is further such that, when the park-brake-actuating component 18 to which the position-marking structure 30 is mounted is in its full-travel range of positions (as is shown in FIG. 8b), the position-marking structure 30 is aligned with the actual-state sensor 14. Also, in these embodiments, when the park-brake-actuating component 18 to which the position-marking structure 30 is mounted is in its over-travel range of positions (as is shown in FIG. 8c), the position-marking structure 30 is disposed upon a second side of the actual-state sensor 14. The construction of the actual-state sensor 14 and its interaction with the position-marking structure 30 in some of these embodiments is such that, when the actual-state sensor 14 is aligned with the position-marking structure 30 it produces and communicates to the logic device(s) 15 a logic low (binary-digital 0) signal and that when the position-marking structure 30 is disposed upon either the first or second side of the actual-state sensor 14 it produces and communicates to the logic device(s) 15 a logic high (binary-digital 1) signal. In others of these embodiments the actual-state sensor 14 produces and communicates to the logic device(s) 15 a logic high (binary-digital 1) signal when it is aligned with the position-marking structure 30 and produces and communicates to the logic device(s) 15 a logic low (binary-digital 0) signal when the position-marking structure 30 is disposed upon either the first or second side of the actual-state sensor 14.

Some embodiments of a park-brake monitoring-system 12 according to the present invention may include more than one position-marking structure 30 and/or more than one actual-state sensor(s) 14 that are disposed adjacent to and/or partially within the path of travel of the position-marking structure(s) 30. For instance, FIG. 10d shows an embodiment of a park-brake monitoring-system 12 in which there are two position-marking structure(s) 30, one of which is aligned with an actual-state sensor 14 when the park-brake-actuating component 18 is disposed within its under-travel range of positions and the other of which is aligned with the actual-state sensor 14 when the park-brake-actuating component 18 is disposed within its over-travel range of positions. FIG. 10e illustrates an embodiment of a park-brake monitoring-system 12 that includes two actual-state sensor(s) 14 with one of which the position-marking structure 30 is aligned when the park-brake-actuating component 18 is disposed within its under-travel range of positions and with the other of which the position-marking structure 30 is aligned when the park-brake-actuating component 18 is disposed within its over-travel range of positions. The embodiment illustrated by FIG. 10e is one of many different ways that a park-brake monitoring-system 12 according to the present invention could be configured in order to make an under-travel signal produced and communicated by the actual-state sensor(s) 14 to the logic device(s) 15 discernible to the logic device(s) 15 from an over-travel signal produced and communicated to the logic device(s) 15 by the actual-state sensor(s) 14. It is anticipated that there are a number of ways that a person of ordinary skill in the art could utilize position-marking structure(s) 30 and actual-state sensor(s) 14 interacted with one another according to the basic principles taught by this disclosure, yet not exactly like any of the embodiments specifically disclosed, in order to communicate signals that are indicative of which of their under-travel range of positions, their full-travel range of positions, and their over-travel range of positions the park-brake-actuating component(s) 18 of a park-brake system 11 are disposed in to the logic device(s) 15 of a park-brake monitoring-system 12 in accordance with this invention.

The logic device(s) 15 of the park-brake monitoring-system 12 may be one of any of a number of different designs and may be interacted with the other components of the park-brake monitoring-system 12 in any of a number of different ways. The logic device(s) 15 may be a collection of discrete gates, resistors, transistors, or other electrical components capable of interpreting the signals received from the actual-state sensor(s) 14 and the selected-state sensor(s) 13 and effecting appropriate outputs as described in greater detail above and below. In some embodiments the logic device(s) 15 of the park-brake monitoring-system 12 consist of a microcomputer running software programs. In still other embodiments the logic device(s) 15 comprise a combination of discrete gates, resistors, transistors or other electrical components communicatively linked to one or more microcomputers running software programs. The factors that control the logic according to which the logic device(s) 15 operate are dependent upon the construction of the logic device(s) 15 themselves. The construction of and the manner of communicative linkage of any discrete gates, resistors, transistors, other electrical components, and/or microcomputers of the logic device(s) 15 along with any software programs that any microcomputers of the logic device(s) 15 run, control the logic according to which the logic device(s) 15 will operate. It is anticipated that one of ordinary skill in the art could easily conceive many different configurations of the logic device(s) 15 and any software programs that they run in order to effect operation of the logic device(s) 15 in a manner consistent with the operation of the logic device(s) 15 as outlined in this disclosure.

The logic device(s) 15 of the park-brake monitoring-system 12 may be communicatively linked to various types of indicators that can be activated by the logic device(s) 15 in order to communicate the operational state of the park-brake system 11 and/or to communicate malfunction of the park-brake system 11 and/or the park-brake monitoring-system 12 to an operator. Each of the indicators of a park-brake monitoring-system 12 according to the present invention comprises one or more visual indicators, such as lights, and/or one or more audio indicators, such as buzzers or bells. Indicators that the park-brake monitoring-system 12 of the present invention may have communicatively linked to the logic device(s) 15 thereof include, but are not limited to, a park-brake-set indicator 17, a park-brake-released indicator 22, and a park-brake system/park-brake monitoring-system malfunction-indicator 38. Each of the indicators of a park-brake monitoring-system 12 according to the present invention may comprise separate and distinct components from each of the other indicators. For example, as is shown in FIGS. 11a, 11b, and 11c, a park-brake monitoring-system 12 may comprise a park-brake-set indicator 17 that comprises a first light, a park-brake-released indicator 22 that comprises a second light, and a park-brake system/park-brake monitoring-system malfunction-indicator 38 that comprises a third light. Alternatively, a given component may function as part of more than one indicator of the park-brake monitoring-system 12. For example, a light may function as a park-brake-set indicator 17 when it is lit red, as a park-brake-released indicator 22 when it is lit green, and as a park-brake system/park-brake monitoring-system malfunction-indicator 38 when it is flashing red. Additionally, the indicators of a park-brake monitoring-system 12 according to the present invention may be shared with other systems of the vehicle 10. For instance, a park-brake system/park-brake monitoring-system malfunction-indicator 38 of a park-brake monitoring-system 12 according to the present invention may be one and the same component as a service-brake malfunction-indicator of the vehicle 10.

The logic according to which the logic device(s) 15 of one embodiment of a park-brake monitoring-system 12 of the present invention operates will now be described with reference to FIGS. 2 and 3. FIGS. 2 and 3 correspond to embodiments of a park-brake monitoring-system 12 that are configured in such a manner that the communication of an under-travel signal to the logic device(s) 15 is not discernible by the logic device(s) 15 from the communication of an over-travel signal to the logic device(s) 15. As a result of the manner in which a park-brake monitoring-system 12 in accordance with the present invention is configured and interacted with a park-brake system 11, which is outlined in greater detail above, only one signal combination comprising a set-requested signal or a release-requested signal and an under-travel signal, a full-travel signal, or an over-travel signal can be communicated to the logic device(s) 15 at any one time. As is illustrated by FIG. 2 there is a maximum of six possible signal combinations comprising a set-requested signal or a release-requested signal and an under-travel signal, a full-travel signal, or an over-travel signal that can be communicated to the logic device(s) 15 of park-brake monitoring-systems 12 according to the present invention. Of course, some embodiments of a park-brake monitoring-system 12 according to the present invention may not have the capability to effect communication of one or more of a set-requested signal, a release-requested signal, an under-travel signal, a full-travel signal, and an over-travel signal to the logic device(s) 15 and, thus, for some embodiments of park-brake monitoring-systems 12 according to the present invention it is only possible for a subset of the six possible signal combinations comprising a set-requested signal or a release-requested signal and an under-travel signal, a full-travel signal, or an over-travel signal to be communicated to the logic device(s) 15. Of the six possible signal combinations comprising a set-requested signal or a release-requested and an under-travel signal, a full-travel signal, or an over-travel signal that can be communicated to the logic device(s) 15 of a park-brake monitoring-system 12 according to the present invention, for an embodiment of the park-brake monitoring-system 12 that corresponds to FIGS. 2 and 3, three of the signal combinations are implicative of proper functioning of the park-brake monitoring-system 12 and the park-brake system 11 monitored thereby and three of the signal combinations are indicative of malfunction of the park-brake monitoring-system 12 and/or the park-brake system 11 monitored thereby. The three signal combinations that are implicative of proper functioning of the park-brake system 11 and the park-brake monitoring-system 12 are considered to be allowed signal combinations. The three signal combinations that are indicative of malfunctioning of the park-brake system 11 and/or the park-brake monitoring-system 12 are considered to be non-allowed signal combinations. Each of blocks 201, 202, 203, 204, 205 and 206 of FIG. 2 corresponds to circumstances during operation of a park-brake monitoring-system 12 in which one of the six possible signal combinations comprising a set-requested signal or a release-requested signal and an under-travel signal, a full-travel signal, or an over-travel signal are being communicated to the logic device(s) 15. Each of blocks 201–206 of FIG. 2 indicates whether the signal combination that it corresponds with is considered to be an allowed signal combination or a non-allowed signal combination. Block 201 of FIG. 2 corresponds to circumstances in which a signal combination comprising a set-requested signal and an under-travel signal are being communicated to the logic device(s) 15. As is indicated in block 201 the communication of this signal combination to the logic device(s) 15 is considered to be non-allowed because it is implicative that a set operational state of the park-brake system 11 has been selected by an operator and that the actual operational state of the park-brake system 11 is not set. Block 202 of FIG. 2 corresponds to circumstances in which a signal combination comprising a set-requested signal and a full-travel signal are being communicated to the logic device(s) 15. As is indicated in block 202 the communication of this signal combination to the logic device(s) 15 is considered to be allowed because it is implicative that a set operational state of the park-brake system 11 has been selected by an operator and that the park-brake system 11 actually has a set operational state. Block 203 of FIG. 2 corresponds to circumstances in which a signal combination comprising a set-requested signal and an over-travel signal are being communicated to the logic device(s) 15. As is indicated in block 203 the communication of this signal combination to the logic device(s) 15 is considered to be non-allowed because it is implicative that a set operational state of the park-brake system 11 has been selected by an operator and that the actual operational state of the park-brake system 11 is not set. Block 204 of FIG. 2 corresponds to circumstances in which a signal combination comprising a release-requested signal and an under-travel signal are being communicated to the logic device(s) 15. As is indicated in block 204 the communication of this signal combination to the logic device(s) 15 is considered to be allowed because it is implicative that a released operational state of the park-brake system 11 has been selected by an operator and that the actual operational state of the park-brake system 11 is not set. Block 205 of FIG. 2 corresponds to circumstances in which a signal combination comprising a release-requested signal and a full-travel signal are being communicated to the logic device(s) 15. As is indicated in block 205 the communication of this signal combination to the logic device(s) 15 is considered to be non-allowed because it is implicative that a released operational state of the park-brake system 11 has been selected by an operator and that the actual operational state of the park-brake system 11 is set. Block 206 of FIG. 2 corresponds to circumstances in which a signal combination comprising a release-requested signal and an over-travel signal are being communicated to the logic device(s) 15. As is indicated in block 206 the communication of this signal combination to the logic device(s) 15 is considered to be allowed because it is implicative that a released operational state of the park-brake system 11 has been selected by an operator and that the actual operational state of the-park brake system 11 is not set.

FIG. 3 outlines actions that the logic device(s) 15 of a park-brake monitoring-system 12, which is configured in such a manner that the communication to the logic device(s) 15 of an under-travel signal is not discernible by the logic device(s) 15 from the communication of an over-travel signal thereto, may execute as a result of communication of each of the six possible signal combinations comprising a set-requested signal or a release-requested signal and an under-travel signal, a full-travel signal, or an over-travel signal to the logic device(s) 15. FIG. 3 includes blocks 301, 302, 303, 304, 305, and 306 which respectively correspond to the same operating circumstances of a park-brake monitoring-system 12 as do blocks 201, 202, 203, 204, 205 and 206 of FIG. 2. The existence of the circumstances to which each one of blocks 301–306 of FIG. 3 corresponds is sufficient to warrant execution of the actions that are listed in the block by the logic device(s) 15 of a park-brake monitoring-system 12 according to the present invention. In fact, the logic device(s) 15 of any park-brake monitoring-system 12 according to the present invention operate according to logic such that at least one of the actions listed in one of blocks 301–305 of FIG. 3 is executed by the logic device(s) 15 whenever circumstances exist which correspond to the one of blocks 301–305 within which the action is listed. FIG. 3 is not meant to imply, however, that a park-brake monitoring-system 12 according to the present invention must execute every one of the actions listed in a given one of blocks 301–306 every time circumstances exist that correspond to the given one of blocks 301–306. Likewise, FIG. 3 is not meant to imply that the list of actions contained thereon are the only actions that can be executed by the logic device(s) 15 of a park-brake monitoring-system 12 according to the present invention whether or not circumstances that correspond to one of blocks 301–306 thereof exist. Furthermore, FIG. 3 is not meant to imply that the actions listed in blocks 301–306 thereof can only be appropriately executed, by the logic device(s) 15 of a park-brake monitoring-system 12 according to the present invention, when conditions exist that correspond to blocks 301–306. Some of the actions listed in blocks 301–306 cannot be executed by some constructions of park-brake monitoring-systems 12 in accordance with the present invention. Certain ones of blocks 301–306 list actions that are mutually exclusive alternatives to one another. Additionally, as is explained above, some embodiments of park-brake monitoring-systems 12 according to the present invention are configured in such a manner that the circumstances that correspond to one or more of blocks 301–306 may never exist for those embodiments of the park-brake monitoring-system 12. Of course, in some embodiments, the configuration of the park-brake monitoring-system 12 is such that it is possible for everyone of the sets of circumstances to which blocks 301–306 correspond to occur during operation of the park-brake monitoring-system 12. As it can be gleaned from FIG. 3 and this disclosure some of the actions that it is appropriate for the logic device(s) 15 of a park-brake monitoring-system 12 according to the present invention to execute during one set of circumstances are the same as actions that it is appropriate for the logic device(s) 15 to execute during other sets of circumstances. It will be understood that those actions that are executable by the logic device(s) 15 and that are identically identified and described in this disclosure and in the figures are only necessarily the same to the extent described in this description and that the details of execution not explicitly described in this disclosure for the identically identified actions may vary with each specific execution of those actions in any of a number of ways well-known to and/or easily imaginable by one of ordinary skill in the art. In particular, the details of specific executions of actions that are identically identified herein may vary from one another in a manner that corresponds with different sets of circumstances in which the actions are executed. For example, production by the logic device(s) 15 of a monitoring signal that is an error signal is appropriate in a first instance when a signal combination comprising a set-requested signal and an under-travel signal is being communicated to the logic device(s) 15 and also in a second instance when a signal combination comprising a release-requested signal and a full-travel signal is being communicated to the logic device(s) 15. While a monitor signal that is an error signal is appropriately produced in both the first instance and the second instance, the details of the production of the error signal may appropriately be different, such as by different information content in the error signal, between the first instance and the second instance as a result of the different circumstances that drove the production of the error signal and the desirability that operators and or systems of the vehicle 10 react differently to the error signals produced in the first instance and the second instance. Likewise, the details of execution of a given action listed in a given one of blocks 301–306 of FIG. 3 or within a given block of FIG. 7, may vary, in a manner tailored to aspects of the circumstances of operation of the vehicle 10 other than those discussed in detail in this disclosure, with different specific executions of the action.

The circumstances that correspond to blocks 301, 303, and 305 of FIG. 3 are all circumstances in which a signal combination that is indicative of malfunction of the park-brake system 11 and/or the park-brake monitoring-system 12 and is, thus, considered a non-allowed signal combination, is being communicated to the logic device(s) 15 of the park-brake monitoring-system 12. As is indicated by FIG. 3, it is appropriate for the logic device(s) 15 of a park-brake monitoring-system 12 according to the present invention to produce a monitoring signal that is an error signal when circumstances that correspond to any of blocks 301, 303, or 305 exist. A monitor signal that is an error signal produced by the logic device(s) 15 of a park-brake monitoring-system 12 according to the present invention may exist in any of a number of different mediums. In some embodiments a monitoring signal produced by the logic device(s) 15 is an electrical signal. A monitoring signal that is an error signal produced by the logic device(s) 15 of a park-brake monitoring-system 12 according to the present invention may remain in the circuits of the logic device(s) 15 thereof for use in causing the operation of the park-brake monitoring-system 12 or any other systems of the vehicle 10 that are controlled by the logic device(s) 15 of the park-brake monitoring-system 12 in a manner appropriate for circumstances in which the park-brake system 11 and/or the park-brake monitoring-system 12 have malfunctioned. Alternatively or additionally a monitoring signal that is an error signal produced by the logic device(s) 15 of a park-brake monitoring-system 12 according to the present invention may be communicated by the logic device(s) 15 to one or more other systems or components of the vehicle 10 or other components not of the vehicle 10, such as maintenance devices, in order to cause the operation of those systems, components, and/or devices in a manner appropriate for circumstances in which the park-brake system 11 and/or the park-brake monitoring-system 12 have malfunctioned. An appropriate action that the logic device(s) 15 of a park-brake monitoring-system 12 according to the present invention may execute as an alternative to producing a monitoring signal that is an error signal, when circumstances exist that correspond to one of blocks 301, 303, and 305 of FIG. 3, is execution of a malfunction-verification algorithm. A malfunction-verification algorithm according to the present invention has the purpose of reducing the possibility of the logic device(s) 15 producing an unwarranted monitoring signal that is an error signal. One of the possible result of the execution of a malfunction-verification algorithm according to the present invention is the production of a monitoring signal that is an error signal by the logic device(s) 15 of the park-brake monitoring-system 12 after the logic device(s) 15 have executed other steps that are intended to verify that such a production of a monitoring signal that is an error signal is warranted. The details of execution of a malfunction-verification algorithm according to the present invention are discussed in greater detail below. As was mentioned above, some park-brake monitoring systems 12 according to the present invention comprise a park-brake system/park-brake monitoring-system malfunction-indicator 38. One action that it is appropriate for the logic device(s) 15 of a park-brake monitoring-system 12 that comprises a park-brake system/park-brake monitoring-system malfunction-indicator 38 to execute, when circumstances that correspond to block 301, 303, or 305 exist, is the activation of the park-brake system/park-brake monitoring-system malfunction-indicator 38 to indicate to an operator of the vehicle 10 that a malfunction of the park-brake system 11 and/or the park-brake monitoring-system 12 has occurred. The logic device(s) 15 of a park-brake monitoring-system 12 according to the present invention execute the action of activating a park-brake system/park-brake monitoring-system malfunction-indicator 38 only after a monitoring signal that is an error signal has been generated. Some vehicles 10 that have a park-brake monitoring-system 12 according to the present invention also have computer memory to which the logic device(s) 15 of the park-brake monitoring-system 12 are communicatively linked. For embodiments of the present invention in which the vehicle 10 comprises computer memory to which the logic device(s) 15 of the park-brake monitoring-system 12 are communicatively linked, another action that it is appropriate for the logic device(s) 15 to execute because of the existence of circumstances that correspond to one of blocks 301, 303, and 305 of FIG. 3 is, storing, in the computer memory of the vehicle 10, a fault code that is interpretable to indicate malfunction of the park-brake system 11 and/or the park-brake monitoring-system 12. Generally, but not necessarily, the action of storing in computer memory of the vehicle 10 a fault code that is interpretable to indicate malfunction of the park-brake system 11 and/or park-brake monitoring-system 12 is executed by the logic device(s) 15 only after the logic device(s) 15 have produced a monitoring signal that is an error signal.

The circumstances that block 302 of FIG. 3 corresponds to, which are the communication to the logic device(s) 15 of a signal combination comprising a set-requested signal and a full-travel signal, are considered to be allowed circumstances of operation of the park-brake monitoring-system 12 and are implicative of the park-brake system 11 having a set operational state. As a result, one action that it is appropriate for the logic device(s) 15 of the present invention to execute because of the existence of the circumstances to which block 302 of FIG. 3 corresponds is the production of a park-brake-set signal. A park-brake-set signal produced by the logic device(s) 15 may exist in any of a number of different mediums. In many embodiments of park-brake monitoring-systems 12 according to the present invention, a park-brake-set signal produced by the logic device(s) 15 is an electrical signal. A park-brake-set signal produced by the logic device(s) 15 may remain within the circuits of the logic device(s) 15 for use in causing operation of the park-brake monitoring-system 12 and/or any other systems controlled by the logic device(s) 15 thereof in a manner appropriate for circumstances in which the park-brake system 11 has a set operational state. Alternatively or additionally a park-brake-set signal produced by the logic device(s) 15 of a park-brake monitoring-system 12 according to the present invention may be communicated by the logic device(s) 15 to one or more other systems or components of the vehicle 10 and/or devices not of the vehicle 10, such as maintenance devices, in order to cause the operation of those systems, components, and or devices in a manner appropriate for circumstances in which the park-brake system 11 has a set operational state. As was mentioned above, some park-brake monitoring-systems 12 according to the present invention include a park-brake-set indicator 17. For such embodiments of park-brake monitoring-systems 12 an action that it is appropriate for the logic device(s) 15 to execute as a result of the existence of the circumstances to which block 302 of FIG. 3 corresponds is activating the park-brake-set indicator 17 to indicate to an operator of the vehicle 10 that the park-brake system 11 thereof has a set operational state.

For park-brake monitoring-systems 12 for which the communication of an under-travel signal to the logic device(s) 15 is not discernible by the logic device(s) 15 from the communication of an over-travel signal thereto, the circumstances that blocks 304 and 306 of FIG. 3 correspond to are considered to be allowed circumstances of operation of the park-brake monitoring-system 12 and are implicative that the park-brake system 11 does not have a set operational state. As a result, one action that it is appropriate for the logic device(s) 15 of such a park-brake monitoring-system 12 to execute because of the existence of the circumstances to which either of blocks 304 and 306 of FIG. 3 corresponds is the production of a park-brake-released signal. A park-brake-released signal produced by the logic device(s) 15 may exist in any of a number of different mediums. In many embodiments of a park-brake monitoring-system according to the present invention a park-brake-released signal is an electrical signal. A park-brake-released signal produced by the logic device(s) 15 may remain within the circuits of the logic device(s) 15 for use in causing operation of the park-brake monitoring-system 12 and/or any other systems controlled by the logic device(s) 15 thereof in a manner appropriate for circumstances in which the park-brake system 11 does not have a set operational state. Alternatively or additionally a park-brake-released signal produced by the logic device(s) 15 of a park-brake monitoring-system 12 according to the present invention may be communicated by the logic device(s) 15 to one or more other systems or components of the vehicle 10 and/or devices not of the vehicle 10, such as maintenance devices, in order to cause the operation of those systems, components, and/or devices in a manner appropriate for circumstances in which the park-brake system 11 does not have a set operational state. Another action that it is appropriate for the logic device(s) 15, of a park-brake monitoring-system for which the communication to the logic device(s) 15 of an under-travel signal is not discernible by the logic device(s) 15 from the communication thereto of an over-travel signal, to execute as a result of the existence of the circumstances to which either one of blocks 304 and 306 of FIG. 3 corresponds is activating a park-brake-released indicator 22 to indicate to an operator of the vehicle 10 that the park-brake system 11 thereof does not have a set operational state.

FIGS. 6 and 7 illustrate logic that a park-brake monitoring-system 12 may be operated in accordance with alternative to the logic illustrated by FIGS. 2 and 3. The logic exemplified by FIGS. 6 and 7 is generally applicable to embodiments of a park-brake monitoring-system 12 according to the present invention that is configured in such a manner that the communication of an under-travel signal to the logic device(s) 15 is discernible by the logic device(s) 15 from the communication of an over-travel signal to the logic device(s) 15. FIGS. 6 and 7 respectively convey the same type of information in the same format as FIGS. 2 and 3 with the exception that the information in FIGS. 6 and 7 applies to park-brake monitoring-systems 12 that are configured in such a manner that the communication of an under-travel signal to the logic device(s) 15 is discernible by the logic device(s) 15 from the communication of an over-travel signal thereto whereas the information in FIGS. 2 and 3 applies to park-brake monitoring-systems 12 that are configured in such a manner that the communication of an under-travel signal to the logic device(s) 15 is not discernible by the logic device(s) 15 from the communication of an over-travel signal thereto. As can be seen by comparing FIG. 2 with FIG. 6 and by comparing FIG. 3 with FIG. 7, in most circumstances the logic according to which a park-brake monitoring-system 12 is operated is the same regardless of whether or not an under-travel signal communicated to the logic device(s) 15 is discernible by the logic device(s) 15 from an over-travel signal communicated to the logic device(s) 15. The exception to this congruence between the logic according to which these two different categories of park-brake monitoring-systems 12 are operated exists in the circumstance where a signal combination comprising a release-requested signal and an over-travel signal is being communicated to the logic device(s) 15. As can be seen in Block 606 of FIG. 6, for a park-brake monitoring-system 12 for which the communication of an under-travel signal to the logic device(s) 15 is discernible by the logic device(s) 15 from the communication of an over-travel signal thereto, the communication of a signal combination comprising a release-requested signal and an over-travel signal to the logic device(s) 15 is considered to be a non-allowed circumstance. The communication of this signal combination to the logic device(s) 15 of the types of park-brake monitoring-system 12 to which FIGS. 6 and 7 correspond is considered to be non-allowed because, although it is implicative that a released operational state of the park-brake system 11 has been selected, that the actual operational-state of the park-brake system 11 is not set, and that, therefore there is no immediate hindrance to proper operation of the vehicle 10, the over-travel signal in and of itself is implicative that components of the park-brake system 11 have failed and/or that the park-brake system 11 is maladjusted, either of which conditions would result in malfunction of the park-brake system 11 when the set operational state thereof is selected. Block 706 of FIG. 7 lists actions that can be appropriately be executed by the logic device(s) 15 of a park-brake monitoring-system 12 for which the communication of an under-travel signal to the logic device(s) 15 is discernible by the logic device(s) 15 from the communication of an over-travel signal thereto, when a signal combination comprising a release-requested signal and an over-travel signal is communicated to those logic device(s) 15. One such action that the logic device(s) 15 of such a park-brake monitoring-system 12 may appropriately execute in such circumstances is the production of a monitoring signal that is an error signal. Another such action that the logic device(s) 15 may execute in such situations as an alternative to producing a monitoring signal that is an error signal is the execution of a malfunction-verification algorithm. The purpose of executing a malfunction-verification algorithm is to reduce the likelihood that the logic device(s) 15 will produce an unwarranted monitoring signal that is an error signal. On possible result of the execution of a malfunction-verification algorithm is the production by the logic device(s) 15 of a monitoring-signal that is an error signal after execution of other steps intended to verify that the production of a monitoring signal that is an error signal is warranted. The details of a malfunction-verification algorithm according to the present invention are described in greater detail below. As was mentioned above, some embodiments of park-brake monitoring-systems 12 according to the present invention comprise a park-brake system/ park-brake monitoring-system malfunction-indicator 38. Another action that the logic device(s) 15 of a park-brake monitoring-system 12 that corresponds to FIGS. 6 and 7 may appropriately execute because of the existence of circumstances that correspond to block 706 of FIG. 7 is the activation of a park-brake system/park-brake monitoring-system malfunction-indicator 38. As was mentioned above, some embodiments of vehicles 10 in accordance with the present invention include computer memory to which the logic device(s) 15 of the park-brake monitoring-system 12 are communicatively linked. Another action that the logic device(s) 15 of a park-brake monitoring-system 12 that corresponds to FIGS. 6 and 7 may execute because of the existence of circumstances that correspond to block 706 of FIG. 7 is the storing in computer memory of the vehicle 10 a fault code that is interpretable to indicate a malfunction of the park-brake system 11 and/or the park-brake monitoring-system 12 has occurred. It will be understood that, while it is preferred for the logic device(s) 15 of embodiments of park-brake monitoring-systems 12 for which the communication of an under-travel signal to the logic device(s) 15 is discernible by the logic device(s) 15 from the communication thereto of an over-travel signal to operate in accordance with the logic exemplified by FIGS. 6 and 7 and as described directly above, the logic device(s) 15 of such park-brake monitoring-system 12 may operate in accordance with the logic exemplified by FIGS. 2 and 3.

Figure 4:
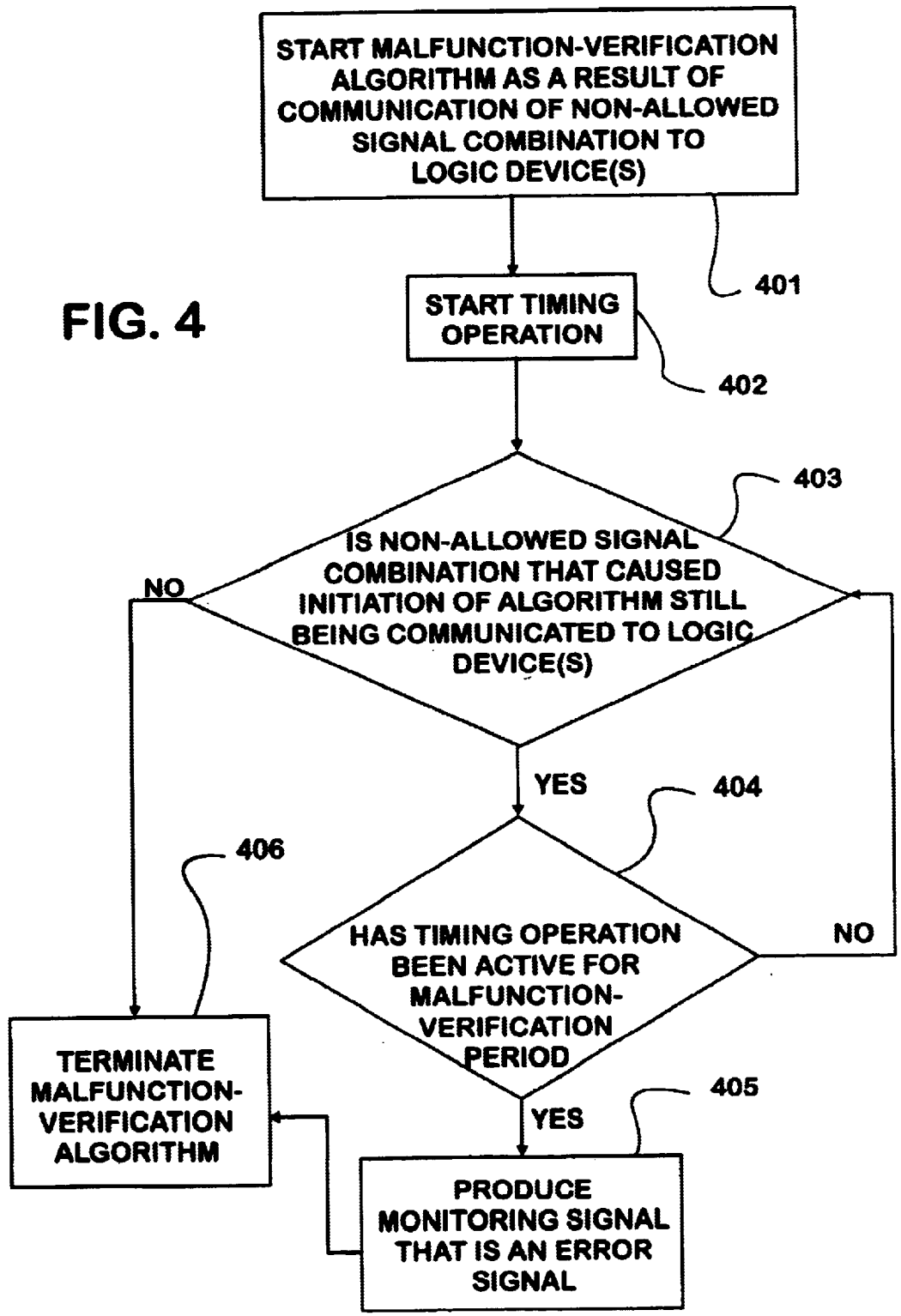
FIG. 4 is a flow chart illustrating the general steps of operation of a malfunction-verification algorithm according to the present invention.

As was mentioned above, the logic device(s) 15 of a park-brake monitoring-system 12 according to the present invention may appropriately execute a malfunction-verification algorithm instead of immediately generating a monitoring signal that is an error signal when a non-allowed signal combination comprising a set-requested signal or a release-requested signal and an under-travel signal, a full-travel signal, or an over-travel signal is communicated to the logic device(s) 15. The configuration of some park-brake systems 11 is such that, when an operator utilizes the operator interface 32 to change the selected operational state of the park-brake system 11, there is a transition period before the components of the park-brake-system controls 19 and the park-brake system 11 can effect an actual operational state of the park-brake system 11 that is the same as the newly selected operational state of the park-brake system 11. As a result, the logic device(s) 15 of a park-brake monitoring-system 12 may have a non-allowed combination of signals comprising a set-requested signal or a release-requested signal and an under-travel signal, a full-travel signal, or an over-travel signal communicated to them during the transition period following a change of the selected operational state of the park-brake system 11. The logic device(s) 15 of a park-brake monitoring-system 12 are less likely to produce an inappropriate error signal during transition periods of the park-brake system 11 if, upon initial communication of a non-allowed signal combination comprising a set-requested signal or a release-requested signal and an under-travel signal, a full-travel signal, or an over-travel signal, the logic device(s) 15 execute a malfunction-verification algorithm according to the present invention instead of immediately producing an error signal. FIG. 4 is a flow chart that illustrates a general embodiment of a malfunction-verification algorithm that the logic device(s) 15 may execute. At step 401 the malfunction-verification algorithm is started by the logic device(s) 15 as a result of an initiation of communication to the logic device(s) 15 of a non-allowed signal combination comprising a set-requested signal or a release-requested signal and an under-travel signal, a full-travel signal, or an over-travel signal. Proceeding onward to step 402 the logic device(s) 15 start a timing operation. At step 403, the logic device(s) 15 determine if the non-allowed signal combination, the communication of which to the logic device(s) 15 drove the initiation of the malfunction-verification algorithm, is still being communicated to the logic device(s) 15. If it is determined at step 403 that the same non-allowed signal combination, the communication of which to the logic device(s) 15 caused initiation of the malfunction-verification algorithm, is no longer being communicated to the logic device(s) 15, the logic device(s) 15 terminate execution of the malfunction-verification algorithm at step 406. If it is determined at step 403 that the non-allowed signal combination, the communication of which to the logic device(s) 15 caused initiation of the malfunction-verification algorithm, is still being communicated to the logic device(s) 15, it is determined at step 404 if the timing operation has been active for a malfunction-verification period. The malfunction-verification period is a predetermined period of time that it is desired to have the logic device(s) 15 wait upon an initiation of communication of a non-allowed signal combination to the logic device(s) 15 before the logic device(s) 15 produce a monitoring signal that is an error signal. If at step 404 it is determined that the timing operation has not been active for the appropriate malfunction-verification period, execution of the malfunction-verification algorithm by the logic device(s) 15 returns to step 403 where it determines once again if the same non-allowed signal combination is still being communicated to the logic device(s) 15. If at step 404 it is determined that the timing operation has been active for the appropriate malfunction-verification period, execution of the malfunction-verification algorithm proceeds to step 405 where the logic device(s) 15 produce a monitoring signal that is an error signal. Thus, once the logic device(s) 15 begin execution of the malfunction-verification algorithm, the logic device(s) 15 start and continue a timing operation until the non-allowed signal combination, communication of which to the logic device(s) 15 caused initiation of the malfunction-verification algorithm, is no longer being communicated to the logic device(s) 15 or the timing operation has been active for an appropriate malfunction-verification period. If, during a given execution of the malfunction-verification algorithm, the non-allowed signal combination, communication of which to the logic device(s) 15 caused initiation of the given execution of the malfunction-verification algorithm, ceases to be communicated to the logic device(s) 15 before the timing operation has been active for an appropriate malfunction-verification period, the execution of the given malfunction-verification period is terminated by the logic device(s) 15.

The logic according to which the logic device(s) 15 operate may be such that the length of the malfunction-verification period is the same for every execution of a malfunction-verification algorithm by the logic device(s) 15. Alternatively, the logic according to which the logic device(s) 15 operate may be such that there are multiple different lengths of malfunction-verification periods that are defined thereby and each of which different lengths of malfunction-verification periods is utilized by the logic device(s) 15 during the execution of malfunction-verification algorithm(s) under different circumstances than those in which others of the different length malfunction-verification periods would be utilized during an execution of the malfunction-verification algorithm. One manner of determining an appropriate length for a given malfunction-verification period is to determine the likely length of transition periods of the park-brake system 11 in circumstances in which the logic device(s) 15 would utilize the given malfunction-verification period during execution of a malfunction-verification algorithm and to make the given malfunction-verification period at least as long as the longest of those transition periods. For example, in one embodiment of a vehicle 10 according to the present invention the park-brake system 11 is constructed in such a manner that the transition periods of the park-brake system 11 are all likely to be less than 5 seconds and the logic according to which the logic device(s) 15 operate is configured such that the logic device(s) 15 utilize a malfunction-verification period of a length of 5 seconds during any execution of a malfunction-verification algorithm.

FIG. 5 is a flow chart that illustrates a portion of operation of the logic device(s) 15 of an embodiment of a park-brake monitoring-system 12 in which a set-requested signal has a logic low (binary-digital 0) value, a release-requested signal has a logic high (binary-digital 1) value, an under-travel signal and an over-travel signal both have a logic high (binary-digital 1) value, and a full-travel signal has a logic low (binary-digital 0) value. The algorithm illustrated by FIG. 5 comprises a malfunction-verification algorithm that starts at step 503 with the starting of a timing operation and ends at 507 or 508 with the termination of the malfunction-verification algorithm or at step 515 with the production of a monitoring signal that is an error signal, the activation of a park-brake system/park-brake monitoring-system malfunction-indicator 38 and the storing of a fault code in computer memory of the vehicle 10. As can be seen in FIG. 5, the malfunction-verification period for the malfunction-verification algorithm that starts at step 503 is 5 seconds long. The algorithm illustrated by FIG. 5 also comprises a malfunction-verification algorithm that starts at step 511 with the starting of a timing operation and ends at 516 or 517 with the termination of the malfunction-verification algorithm or at step 515 with the production of a monitoring signal that is an error signal, the activation of a park-brake system/park-brake monitoring-system malfunction-indicator 38 and the storing of a fault code in computer memory of the vehicle 10. As can be seen in FIG. 5, the malfunction-verification period for the malfunction-verification algorithm that starts at step 511 is 5 seconds long.

A park-brake monitoring-system 12 according to the present invention may monitor a park-brake system 11 that has manually-actuated park-brake-actuating component(s) 18 or a park-brake system 11 that has power-actuated park-brake-actuating component(s) 18. Manually-actuated park-brake-actuating component(s) 18 of a park-brake system 11 may have any construction and interaction with one another that allows an operator of the vehicle 10 to actuate and or retract them by apply forces and/or moments to one or more of them. Power-actuated park-brake-actuating component(s) 18 comprise a powered actuator 35 that utilizes stored mechanical and/or electrical energy from an energy storage device on the vehicle 10 to actuate the other park-brake-actuating component(s) 18 of the park-brake system 11. A powered actuator 35 according to the present invention may comprise energy conversion, transfer and storage device(s) including but not limited to rotary electric motors, linear electric motors, fluid-actuated piston-in-cylinder devices, fluid-actuated rotary motors and springs. One embodiment of a powered actuator 35 is shown in FIGS. 8a, 8b, and 8c. The powered actuator 35 shown in FIGS. 8a, 8b, and 8c has a piston 39 that is slideably disposed within the bore of a cylinder 40. A connecting rod 41 for connection to the other park-brake-actuating component(s) 18 of a park-brake system 11 is attached to the piston 39 and extends out of one end of the cylinder 40. Spring(s) 42 are disposed within the cylinder 40 between the piston 39 and the end of the cylinder 40 through which the connecting rod 41 extends. The spring(s) 42 act to drive the piston in the direction opposite that which the connecting rod 41 extends from it. A pressure chamber 43 is defined between the piston 39 and an end of the cylinder opposite that which the connecting rod 41 extends through. When pressurized fluid, which is at sufficient pressure to compress the spring(s) 42, is introduced into the pressure chamber 43 the piston 39 is driven in the direction in which the connecting rod 41 extends from it. Such a powered actuator 35 would have its connecting rod 41 connected to the other park-brake-actuating component(s) 18 in such a manner that when the connecting rod 41 is driven in one direction the park-brake-actuating component(s) 18 are actuated to their set position as described above and that when the connecting rod 41 is driven in an opposite direction the park-brake-actuating component(s) 18 are retracted by or allowed to retract by the connecting rod 41 to their home position as described above.

Those skilled in the art will appreciate that modifications could be made to the invention as described and in some instances some features of the invention will be employed without a corresponding use of other features without departing from the spirit and scope of the invention and thus the scope of the invention is limited only by the following claims.

What is claimed is:

1. A vehicle, comprising:

one or more frame structures to which a majority of other components of said vehicle are engaged directly or indirectly and which function(s) to locate said other components of said vehicle relative to one another;

a suspension system that is engaged to and supports said one or more frame structures;

wherein said suspension system comprises one or more ground-engaging components that are rotatable relative to said one or more frame structure(s) of said vehicle, at least when certain subsystems of said vehicle are in certain operational states, and that provide said vehicle with a relatively low resistance to movement along said ground when they are rotatable relative to said one or more frame structure(s);

one or more body structures engaged directly or indirectly to and supported by said one or more frame structures and upon or within which occupants and/or cargo of said vehicle may reside;

a park-brake system that has a set operational state in which said park-brake system prevents rotation of one or more of said ground-engaging components relative to said one or more frame structures and that also has a release operational state in which said park-brake system does not prevent rotation of any of said ground-engaging components relative to said one or more frame structures;

wherein said park-brake system further comprises park-brake-actuating components that effect or allow said released operational state of said park-brake system when they are in a home position and that effect said set operational state of said park-brake system when they have been actuated away from their home position to a set position;

wherein said park-brake system further comprises park-brake-system controls that are operable by an operator of said vehicle to effect actuation and retraction of said park-brake-actuating components between said home position and said set position;

a park-brake monitoring-system that comprises one or more logic device(s);

wherein said park-brake monitoring-system further comprises one or more selected-state sensor(s) that are communicatively linked to said one or more logic device(s) and that interact with said park-brake-system controls in such a manner that said one or more selected-state sensor(s) produce and communicate to said logic device(s) signals implicative of a requested operational state of said park-brake system;

wherein said park-brake monitoring-system further comprises one or more actual-state sensor(s) that are communicatively linked to said logic device(s) and that interact with said park-brake-actuating components in such manner that said actual-state sensors produce and communicate to said logic device(s) signals implicative of an actual operational state of said park-brake system, which signals that are implicative of an actual operational state of said park brake system are dependent upon position(s) of said park-brake-actuating components relative to said home position and said set position thereof;

wherein said one or more logic device(s) of said park-brake monitoring-system operate in accordance with logic that cause it/them to operate in such a manner that it/they perform the step of:

producing monitoring signals in a manner that is dependent upon both said signal(s) produced and communicated to said logic device(s) by said selected-state sensor(s) and said signal(s) produced and communicated to said logic device(s) by said actual-state sensor(s);

said one or more actual-state sensor(s) produce and communicate to said logic device(s) an under-travel signal when said park-brake-actuating components of said park-brake system are actuated and/or retracted to at least one position in and under-travel range of positions;

said one or more selected-state sensor(s) produce and communicate to said logic device(s) a set-requested signal during any presence in said park-brake system-controls of conditions that are only present when an operator has manipulated said park-brake-system controls in a manner to effect said set operational state of said park-brake system;

said one or more logic device(s) of said park-brake monitoring-system operate in accordance with logic that cause it/them to operate in such a manner that it/they perform the steps of:

when a signal combination comprising an under-travel signal and a said set-requested signal, which is a non-allowed signal combination, is communicated to said logic device(s), executing a malfunction-verification algorithm comprising the steps of:

starting a timing operation;

continuing said timing operation until said timing operation has been active for a malfunction-verification period or said signal combination comprising said under-travel signal and said set-requested signal is no longer being communicated to said logic device(s);

if said signal combination comprising said under-travel signal and said set-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and if said timing operation has been active for said malfunction-verification period before said signal combination comprising said under-travel signal and said set-requested signal ceases to be communicated to said logic device(s), producing a monitoring signal that is an error signal.

2. The vehicle of claim 1, wherein:

(a) said one or more actual-state sensor(s) produce and communicate to said logic device(s) an over-travel signal when said park-brake-actuating components of said park-brake system are actuated to at least one position in an over-travel range of positions; and (b) said one or more logic device(s) of said park-brake monitoring-system operate in accordance with logic that cause it/them to operate in such a manner that it/they perform the step of;

when a signal combination comprising an over-travel signal and said set-requested signal, which is a non-allowed signal combination, is communicated to said logic device(s), executing said malfunction-verification algorithm comprising the steps of:

starting a timing operation;

continuing said timing operation until said timing operation has been active for a malfunction-verification period or said signal combination comprising said over-travel signal and said set-requested signal is no longer being communicated to said logic device(s);

if said signal combination comprising said over-travel signal and said set-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and if said timing operation has been active for said malfunction-verification period before said signal combination comprising said over-travel signal and said set-requested signal ceases to be communicated to said logic device(s), producing a monitoring signal that is an error signal.

3. The vehicle of claim 2 wherein:

(a) said one or more actual-state sensor(s) produce and communicate to said logic device(s) a full-travel signal when said park-brake-actuating components of said park-brake system are actuated to at least one position in a full-travel range of positions;

(b) said one or more selected-state sensor(s) produce and communicate to said logic device(s) said release-requested signal during any presence in said park-brake-system controls of conditions that are only present when an operator has manipulated said park-brake-system controls in a manner to effect said released operational state of said park-brake system;

(c) said one or more logic device(s) of said park-brake monitoring-system operate in accordance with logic that cause it/them to operate in such a manner that it/they perform the steps of:

when a signal combination comprising a full-travel signal and said release-requested signal, which is a non-allowed signal combination, is communicated to said logic device(s), executing a malfunction-verification algorithm comprising the steps of:

starting a timing operation;

continuing said timing operation until said timing operation has been active for a malfunction-verification period or said signal combination comprising said full-travel signal and said release-requested signal is no longer being communicated to said logic device(s);

if said signal combination comprising said full-travel signal and said release-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and if said timing operation has been active for said malfunction-verification period before said signal combination comprising said full-travel signal and said release-requested signal ceases to be communicated to said logic device(s), producing a monitoring signal that is an error signal.

4. The vehicle of claim 3, wherein:

(a) said one or more actual-state sensor(s) consist of a single actual-state sensor that is a binary-digital sensor that produces and communicates to said logic device(s) digital signals comprising a logic low signal and a logic high signal;

(b) said under-travel signal and said over-travel signal that said actual-state sensor produces and communicates to said logic device(s) are both a logic high signal or both a logic low signal; and (c) said full-travel signal that said actual-state sensor produces and communicates to said logic device(s) is whichever of a logic high signal and a logic low signal said under-travel signal and said over-travel signal are not.

5. The vehicle of claim 4, wherein:

(a) said park-brake monitoring-system further comprises one or more park-brake system/park-brake monitoring-system malfunction-indicator(s) that is/are communicatively linked to said one or more logic device(s); and (b) said one or more logic device(s) of said park-brake monitoring-system operate in accordance with logic that cause it/them to operate in such a manner that it/they perform the step of:

activating one or more of said one or more park-brake system/park-brake monitoring-system malfunction-indicator(s) anytime one of said monitoring signals that is an error signal is produced.

6. The vehicle of claim 5, wherein:

(a) said vehicle further comprises computer memory to which said logic device(s) of said park-brake monitoring-system are communicatively linked;

(b) said one or more logic device(s) of said park-brake monitoring-system operate in accordance with logic that cause it/them to operate in such a manner that it/they perform the step of:

storing a fault code that is interpretable to indicate a malfunction of said park-brake system and/or said park-brake monitoring-system in said computer memory anytime one of said monitoring signals that is an error signal is produced.

7. The vehicle of claim 6, wherein:

(a) said park-brake monitoring-system comprises a park-brake-set indicator that is communicatively linked to said logic device(s) and that is operable to indicate to an operator of said vehicle that said park-brake system has said set operational state;

(b) said one or more logic device(s) of said park-brake monitoring-system operate in accordance with logic that cause it/them to operate in such a manner that it/they perform the step of:

when and only when both said selected-state sensor(s) communicate a set-requested signal to said logic device(s) and said actual-state sensor(s) communicate a full-travel signal to said logic device(s), activating said park-brake-set indicator to indicate to an operator of said vehicle that said park-brake system has said set operational state.

8. The vehicle of claim 7, wherein:

(a) said vehicle further comprises a service-brake system with braking components that are separate and distinct from braking-components of said park-brake system.

9. The vehicle of claim 1, wherein:

(a) said park-brake monitoring-system further comprises one or more park-brake system/park-brake monitoring-system malfunction-indicator(s) that is/are communicatively linked to said one or more logic device(s); and (b) said one or more logic device(s) of said park-brake monitoring-system operate in accordance with logic that cause it/them to operate in such a manner that it/they perform the step of:

activating one or more of said one or more park-brake system/park-brake monitoring-system malfunction-indicator(s) anytime one of said monitoring signals that is an error signal is produced.

10. The vehicle of claim 9, wherein:
(a) said vehicle further comprises computer memory to which said logic device(s) of said park-brake monitoring-system are communicatively linked;
(b) said one or more logic device(s) of said park-brake monitoring-system operate in accordance with logic that cause it/them to operate in such a manner that it/they perform the step of:
  storing a fault code that is interpretable to indicate a malfunction of said park-brake system and/or said park-brake monitoring-system in said computer memory anytime one of said monitoring signals that is an error signal is produced.

11. The vehicle of claim 2, wherein:
(a) said park-brake monitoring-system further comprises one or more park-brake system/park-brake monitoring-system malfunction-indicator(s) that is/are communicatively linked to said one or more logic device(s); and
(b) said one or more logic device(s) of said park-brake monitoring-system operate in accordance with logic that cause it/them to operate in such a manner that it/they perform the step of:
  activating one or more of said one or more park-brake system/park-brake monitoring-system malfunction-indicator(s) anytime one of said monitoring signals that is an error signal is produced.

12. The vehicle of claim 11, wherein:
(a) said vehicle further comprises computer memory to which said logic device(s) of said park-brake monitoring-system are communicatively linked;
(b) said one or more logic device(s) of said park-brake monitoring-system operate in accordance with logic that cause it/them to operate in such a manner that it/they perform the step of:
  storing a fault code that is interpretable to indicate a malfunction of said park-brake system and/or said park-brake monitoring-system in said computer memory anytime one of said monitoring signals that is an error signal is produced.

13. The vehicle of claim 12, wherein:
(a) said park-brake monitoring-system comprises position-marking structure that is engaged to one of said park-brake-actuating components;
(b) said actual-state sensor(s) consist of a single actual-state sensor that is a binary-digital sensor that is engaged to said vehicle at a position adjacent a path of travel of said position-marking structure;
(c) said binary-digital sensor, which is said actual-state sensor, is located in such a position that, when said park-brake-actuating components are actuated to positions within a full-travel range of positions, said position-marking structure is aligned with said binary-digital sensor, which is said actual-state sensor, when said park-brake-actuating components are actuated and/or retracted to positions within said under-travel range of positions said position-marking structure is disposed upon a first side of said binary-digital sensor, which is said actual-state sensor, and when said park-brake-actuating components are actuated to positions within said over-travel range of positions said position-marking structure is disposed upon a second side of said binary-digital sensor, which is said actual-state sensor; and
(d) said binary-digital sensor, which is said actual-state sensor, is constructed in such a manner and interacts with said position-marking structure in such a manner that, when said binary-digital sensor, which is said actual-state sensor, and said position-marking structure are aligned with one another, said binary-digital sensor, which is said actual-state sensor, produces and communicate to said logic device(s) either a logic high signal or a logic low signal and, when said position-marking structure is disposed upon either said first side or said second side of said binary-digital sensor, which is said actual-state sensor, said binary-digital sensor, which is said actual-state sensor, produces and communicate to said logic device(s) whichever of a logic high signal and a logic low signal it does not produce and communicate to said logic device(s) when said position marking structure is aligned with it.

14. The vehicle of claim 3, wherein:
(a) said park-brake monitoring-system further comprises one or more park-brake system/park-brake monitoring-system malfunction-indicator(s) that is/are communicatively linked to said one or more logic device(s); and
(b) said one or more logic device(s) of said park-brake monitoring-system operate in accordance with logic that cause it/them to operate in such a manner that it/they perform the step of:
  activating one or more of said one or more park-brake system/park-brake monitoring-system malfunction-indicator(s) anytime one of said monitoring signals that is an error signal is produced.

15. The vehicle of claim 14, wherein:
(a) said vehicle further comprises computer memory to which said logic device(s) of said park-brake monitoring-system are communicatively linked;
(b) said one or more logic device(s) of said park-brake monitoring-system operate in accordance with logic that cause it/them to operate in such a manner that it/they perform the step of:
  storing a fault code that is interpretable to indicate a malfunction of said park-brake system and/or said park-brake monitoring-system in said computer memory anytime one of said monitoring signals that is an error signal is produced.

16. The vehicle of claim 1, wherein:
(a) said one or more actual-state sensor(s) produce and communicate to said logic device(s) a full-travel signal when said park-brake-actuating components of said park-brake system are actuated to at least one position in a full-travel range of positions;
(b) said one or more logic device(s) of said park-brake monitoring-system operate in accordance with logic that cause it/them to operate in such a manner that it/they perform the steps of:
  when a signal combination comprising a full-travel signal and a release-requested signal, which is a non-allowed signal combination, is communicated to said logic device(s), executing a malfunction-verification algorithm comprising the steps of:
    starting a timing operation;
    continuing said timing operation until said timing operation has been active for a malfunction-verification period or said signal combination comprising said full-travel signal and said release-requested signal is no longer being communicated to said logic device(s);
    if said signal combination comprising said full-travel signal and said release-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and if said timing operation has been active for said malfunction-verification period before said signal combination comprising said full-travel signal and said release-requested signal ceases to be communicated to said logic device(s), producing a monitoring signal that is an error signal.

17. The vehicle of claim 16, wherein:

(a) said park-brake monitoring-system further comprises one or more park-brake system/park-brake monitoring-system malfunction-indicator(s) that is/are communicatively linked to said one or more logic device(s); and (b) said one or more logic device(s) of said park-brake monitoring-system operate in accordance with logic that cause it/them to operate in such a manner that it/they perform the step of:

activating one or more of said one or more park-brake system/park-brake monitoring-system malfunction-indicator(s) anytime one of said monitoring signals that is an error signal is produced.

18. A vehicle, comprising:

one or more frame structures to which a majority of other components of said vehicle are engaged directly or indirectly and which function(s) to locate said other components of said vehicle relative to one another;

a suspension system that is engaged to and supports said one or more frame structures;

wherein said suspension system comprises one or more ground-engaging components that are rotatable relative to said one or more frame structure(s) of said vehicle, at least when certain subsystems of said vehicle are in certain operational states, and that provide said vehicle with a relatively low resistance to movement along said ground when they are rotatable relative to said one or more frame structure(s);

one or more body structures engaged directly or indirectly to and supported by said one or more frame structures and upon or within which occupants and/or cargo of said vehicle may reside;

a park-brake system that has a set operational state in which said park-brake system prevents rotation of one or more of said ground-engaging components relative to said one or more frame structures and that also has a release operational state in which said park-brake system does not prevent rotation of any of said around-engaging components relative to said one or more frame structures;

wherein said park-brake system further comprises park-brake-actuating components that effect or allow a released operational state of said park-brake system when they are in a home position and that effect said set operational state of said park-brake system when they have been actuated away from their home position to a set position;

wherein said park-brake system further comprises park-brake-system controls that are operable by an operator of said vehicle to effect actuation and retraction of said park-brake-actuating components between said home position and said set position;

a park-brake monitoring-system that comprises one or more logic device(s);

wherein said park-brake monitoring-system further comprises one or more selected-state sensor(s) that are communicatively linked to said one or more logic device(s) and that interact with said park-brake-system controls in such a manner that said one or more selected-state sensor(s) produce and communicate to said logic device(s) signals implicative of a requested operational state of said park-brake system;

wherein said park-brake monitoring-system further comprises one or more actual-state sensor(s) that are communicatively linked to said logic device(s) and that interact with said park-brake-actuating components in such manner that said actual-state sensors produce and communicate to said logic device(s) signals implicative of an actual operational state of said park-brake system, which signals that are implicative of an actual operational state of said park brake system are dependent upon position(s) of said park-brake-actuating components relative to said home position and said set position thereof;

wherein said one or more logic device(s) of said park-brake monitoring-system operate in accordance with logic that cause it/them to operate in such a manner that it/they perform the step of:

producing monitoring signals in a manner that is dependent upon both said signal(s) produced and communicated to said logic device(s) by said selected-state sensor(s) and said signal(s) produced and communicated to said logic device(s) by said actual-state sensor(s);

said one or more actual-state sensor(s) produce and communicate to said logic device(s) an under-travel signal when said park-brake-actuating components of said park-brake system are actuated and/or retracted to at least one position in and under-travel range of positions;

said one or more actual-state sensor(s) produce and communicate to said logic device(s) a full-travel signal when said park-brake-actuating components of said park-brake system are actuated to at least one position in a full-travel range of positions;

said one or more actual-state sensor(s) produce and communicate to said logic device(s) a full-travel signal when said park-brake-actuating components of said park-brake system are actuated to any position in a full-travel range of positions;

said one or more selected-state sensor(s) produce and communicate to said logic device(s) a set-requested signal during any presence in said park-brake system-controls of conditions that are only present when an operator has manipulated said park-brake-system controls in a manner to effect said set operational state of said park-brake system;

said one or more logic device(s) of said park-brake monitoring-system operate in accordance with logic that cause it/them to operate in such a manner that it/they perform the step of:

producing a park-brake-set signal when and only when said selected-state sensor is producing and communicating to said logic device(s) a set-requested signal and said actual-state sensor is producing and communicating to said logic device(s) a full-travel signal;

said one or more selected-state sensor(s) produce and communicate to said logic device(s) a release-requested signal during any presence in said park-brake system-controls of conditions that are only present when an operator has manipulated said park-brake-system controls in a manner to effect said released operational state of said park-brake system;

said one or more logic device(s) of said park-brake monitoring-system operate in accordance with logic that cause it/them to operate in such a manner that it/they perform the step of:

when and only when said selected-state sensor(s) is/are producing and communicating to said logic device(s) a release-requested signal and said actual-state sensor(s) are not communicating to said logic device(s) a full-travel signal, said one or more logic device(s) producing a park-brake-released signal;

said one or more logic device(s) of said park-brake monitoring-system operate in accordance with logic that cause it/them to operate in such a manner that it/they perform the step of:
  when a signal combination comprising an under-travel signal and a set-requested signal, which is a non-allowed signal combination, is communicated to said logic device(s), executing a malfunction-verification algorithm comprising the steps of:
    starting a timing operation;
    continuing said timing operation until said timing operation has been active for a malfunction-verification period or said signal combination comprising said under-travel signal and said set-requested signal is no longer being communicated to said logic device(s);
    if said signal combination comprising said under-travel signal and said set-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and
    if said timing operation has been active for said malfunction-verification period before said signal combination comprising said under-travel signal and said set-requested signal ceases to be communicated to said logic device(s), producing a monitoring signal that is an error signal.

19. The vehicle of claim 18, wherein:
(a) said one or more logic device(s) of said park-brake monitoring-system operate in accordance with logic that cause it/them to operate in such a manner that it/they perform the step of:
  when a signal combination comprising a full-travel signal and a release-requested signal, which is a non-allowed signal combination, is communicated to said logic device(s), executing said malfunction-verification algorithm comprising the steps of:
    starting a timing operation;
    continuing said timing operation until said timing operation has been active for a malfunction-verification period or said signal combination comprising said full-travel signal and said release-requested signal is no longer being communicated to said logic device(s);
    if said signal combination comprising said full-travel signal and said release-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and
    if said timing operation has been active for said malfunction-verification period before said signal combination comprising said full-travel signal and said release-requested signal ceases to be communicated to said logic device(s), producing a monitoring signal that is an error signal.

20. The vehicle of claim 19, wherein:
(a) said park-brake monitoring-system further comprises one or more park-brake system/park-brake monitoring-system malfunction-indicator(s) that is/are communicatively linked to said one or more logic device(s); and
(b) said one or more logic device(s) of said park-brake monitoring-system operate in accordance with logic that cause it/them to operate in such a manner that it/they perform the step of:
  activating one or more of said one or more park-brake system/park-brake monitoring-system malfunction-indicator(s) anytime one of said monitoring signals that is an error signal is produced.

21. The vehicle of claim 20, wherein:
(a) said vehicle further comprises computer memory to which said logic device(s) of said park-brake monitoring-system are communicatively linked;
(b) said one or more logic device(s) of said park-brake monitoring-system operate in accordance with logic that cause it/them to operate in such a manner that it/they perform the step of:
  storing a fault code that is interpretable to indicate a malfunction of said park-brake system and/or said park-brake monitoring-system in said computer memory anytime one of said monitoring signals that is an error signal is produced.

22. The vehicle of claim 19, wherein:
(a) said one or more actual-state sensor(s) produce and communicate to said logic device(s) an over-travel signal when said park-brake-actuating components of said park-brake system are actuated to positions within an over-travel range of positions; and
(b) said one or more logic device(s) of said park-brake monitoring-system operate in accordance with logic that cause it/them to operate in such a manner that it/they perform the step of;
  when a signal combination comprising an over-travel signal and said set-requested signal, which is a non-allowed signal combination, is communicated to said logic device(s), executing a malfunction-verification algorithm comprising the steps of:
    starting a timing operation;
    continuing said timing operation until said timing operation has been active for a malfunction-verification period or said signal combination comprising said over-travel signal and said set-requested signal is no longer being communicated to said logic device(s);
    if said signal combination comprising said over-travel signal and said set-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and
    if said timing operation has been active for said malfunction-verification period before said signal combination comprising said over-travel signal and said set-requested signal ceases to be communicated to said logic device(s), producing a monitoring signal that is an error signal.

23. The vehicle of claim 22, wherein:
(a) said park-brake monitoring-system comprises position-marking structure that is engaged to one of said park-brake-actuating components;
(b) said actual-state sensor(s) consist of a single actual-state sensor that is a binary-digital sensor that is engaged to said vehicle at a position adjacent a path of travel of said position-marking structure;
(c) said binary-digital sensor, which is said actual-state sensor, is located in such a position that, when said park-brake-actuating components are actuated to positions within a full-travel range of positions, said position-marking structure is aligned with said binary-digital sensor, which is said actual-state sensor, when said park-brake-actuating components are actuated and/or retracted to positions within an under-travel range of positions said position-marking structure is disposed upon a first side of said binary-digital sensor, which is said actual-state sensor, and when said park-brake-actuating components are actuated to positions within an over-travel range of positions of said park-brake-system said position-marking structure is disposed upon a second side of said binary-digital sensor, which is said actual-state sensor; and
(d) said binary-digital sensor, which is said actual-state sensor, is constructed in such a manner and interacts with said position-marking structure in such a manner that, when said binary-digital sensor, which is said actual-state sensor, and said position-marking structure are aligned with one another, said binary-digital sensor, which is said actual-state sensor, produces and communicates to said logic device(s) either a logic high signal or a logic low signal and, when said position-marking structure is disposed upon either said first side or said second side of said binary-digital sensor, which is said actual-state sensor, said binary-digital sensor, which is said actual-state sensor, produces and communicates to said logic device(s) whichever of a logic high signal and a logic low signal it does not produce when said position marking structure is aligned with it.

24. A vehicle, comprising:
one or more frame structures to which a majority of other components of said vehicle are engaged directly or indirectly and which function(s) to locate said other components of said vehicle relative to one another;
a suspension system that is engaged to and supports said one or more frame structures;
wherein said suspension system comprises one or more ground-engaging components that are rotatable relative to said one or more frame structure(s) of said vehicle, at least when certain subsystems of said vehicle are in certain operational states, and that provide said vehicle with a relatively low resistance to movement along said ground when they are rotatable relative to said one or more frame structure(s);
one or more body structures engaged directly or indirectly to and supported by said one or more frame structures and upon or within which occupants and/or cargo of said vehicle may reside;
a park-brake system that has a set operational state in which said park-brake system prevents rotation of one or more of said ground-engaging components relative to said one or more frame structures and that also has a release operational state in which said park-brake system does not prevent rotation of any of said ground-engaging components relative to said one or more frame structures;

wherein said park-brake system further comprises park-brake-actuating components that effect or allow a released operational state of said park-brake system when they are in a home position and that effect said set operational state of said park-brake system when they have been actuated away from their home position to a set position;
wherein said park-brake system further comprises park-brake-system controls that are operable by an operator of said vehicle to effect actuation and retraction of said park-brake-actuating components between said home position and said set position;
a park-brake monitoring-system that comprises one or more logic device(s);
wherein said park-brake monitoring-system further comprises one or more selected-state sensor(s) that are communicatively linked to said one or more logic device(s) and that interact with said park-brake-system controls in such a manner that said one or more selected-state sensor(s) produce and communicate to said logic device(s) signals implicative of a requested operational state of said park-brake system;
wherein said park-brake monitoring-system further comprises one or more actual-state sensor(s) that are communicatively linked to said logic device(s) and that interact with said park-brake-actuating components in such manner that said actual-state sensors produce and communicate to said logic device(s) signals implicative of an actual operational state of said park-brake system, which signals that are implicative of an actual operational state of said park brake system are dependent upon position(s) of said park-brake-actuating components relative to said home position and said set position thereof;
wherein said one or more logic device(s) of said park-brake monitoring-system operate in accordance with logic that cause it/them to operate in such a manner that it/they perform the step of:
producing monitoring signals in a manner that is dependent upon both said signal(s) produced and communicated to said logic device(s) by said selected-state sensor(s) and said signal(s) produced and communicated to said logic device(s) by said actual-state sensor(s);
said one or more actual-state sensor(s) produce and communicate to said logic device(s) an under-travel signal when said park-brake-actuating components of said park-brake system are actuated and/or retracted to at least one position in and under-travel range of positions;
said one or more actual-state sensor(s) produce and communicate to said logic device(s) a full-travel signal when said park-brake-actuating components of said park-brake system are actuated to at least one position in a full-travel range of positions;
said one or more selected-state sensor(s) produce and communicate to said logic device(s) a release-requested signal during any presence in said park-brake system-controls of conditions that are only present when an operator has manipulated said park-brake-system controls in a manner to effect said released operational state of said park-brake system;
said one or more logic device(s) of said park-brake monitoring-system operate in accordance with logic that cause it/them to operate in such a manner that it/they perform the step of:
when and only when said selected-state sensor(s) is/are producing and communicating to said logic device(s) a release-requested signal and said actual-state sensor(s) are not communicating to said logic device(s) a full-travel signal, said one or more logic device(s) producing a park-brake-released signal;

said park-brake monitoring-system further comprises a park-brake-released indicator that is communicatively linked to one or more of said one or more logic device(s) and that is operable to indicate to an operator of said vehicle that said park-brake system has said released operational state;

said one or more logic device(s) of said park-brake monitoring-system operate in accordance with logic that cause it/them to operate in such a manner that it/they perform the steps of:

when and only when said one or more logic device(s) are producing said park-brake-released signal, activating said park-brake-released indicator to indicate to an operator of said vehicle that said park-brake system has said released operational state;

said one or more logic device(s) of said park-brake monitoring-system operate in accordance with logic that cause it/them to operate in such a manner that it/they perform the steps of:

when a signal combination comprising a full-travel signal and a release-requested signal, which is a non-allowed signal combination, is communicated to said logic device(s), executing a malfunction-verification algorithm comprising the steps of:

starting a timing operation;

continuing said timing operation until said timing operation has been active for a malfunction-verification period or said signal combination comprising said full-travel signal and said release-requested signal is no longer being communicated to said logic device(s);

if said signal combination comprising said full-travel signal and said release-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and if said timing operation has been active for said malfunction-verification period before said signal combination comprising said full-travel signal and said release-requested signal ceases to be communicated to said logic device(s), producing a monitoring signal that is an error signal.

25. A vehicle, comprising:

one or more frame structures to which a majority of other components of said vehicle are engaged directly or indirectly and which function(s) to locate said other components of said vehicle relative to one another;

a suspension system that is engaged to and supports said one or more frame structures;

wherein said suspension system comprises one or more ground-engaging components that are rotatable relative to said one or more frame structure(s) of said vehicle, at least when certain subsystems of said vehicle are in certain operational states, and that provide said vehicle with a relatively low resistance to movement along said ground when they are rotatable relative to said one or more frame structure(s);

one or more body structures engaged directly or indirectly to and supported by said one or more frame structures and upon or within which occupants and/or cargo of said vehicle may reside;

a park-brake system that has a set operational state in which said park-brake system prevents rotation of one or more of said around-engaging components relative to said one or more frame structures and that also has a release operational state in which said park-brake system does not prevent rotation of any of said around-engaging components relative to said one or more frame structures;

wherein said park-brake system further comprises park-brake-actuating components that effect or allow a released operational state of said park-brake system when they are in a home position and that effect said set operational state of said park-brake system when they have been actuated away from their home position to a set position;

wherein said park-brake system further comprises park-brake-system controls that are operable by an operator of said vehicle to effect actuation and retraction of said park-brake-actuating components between said home position and said set position;

a park-brake monitoring-system that comprises one or more logic device(s);

wherein said park-brake monitoring-system further comprises one or more selected-state sensor(s) that are communicatively linked to said one or more logic device(s) and that interact with said park-brake-system controls in such a manner that said one or more selected-state sensor(s) produce and communicate to said logic device(s) signals implicative of a requested operational state of said park-brake system;

wherein said park-brake monitoring-system further comprises one or more actual-state sensor(s) that are communicatively linked to said logic device(s) and that interact with said park-brake-actuating components in such manner that said actual-state sensors produce and communicate to said logic device(s) signals implicative of an actual operational state of said park-brake system, which signals that are implicative of an actual operational state of said park brake system are dependent upon position(s) of said park-brake-actuating components relative to said home position and said set position thereof;

wherein said one or more logic device(s) of said park-brake monitoring-system operate in accordance with logic that cause it/them to operate in such a manner that it/they perform the step of:

producing monitoring signals in a manner that is dependent upon both said signal(s) produced and communicated to said logic device(s) by said selected-state sensor(s) and said signal(s) produced and communicated to said logic device(s) by said actual-state sensor(s);

said one or more actual-state sensor(s) produce and communicate to said logic device(s) a full-travel signal when said park-brake-actuating components of said park-brake system are actuated to at least one position in a full-travel range of positions;

said one or more selected-state sensor(s) produce and communicate to said logic device(s) a release-requested signal during any presence in said park-brake system-controls of conditions that are only present when an operator has manipulated said park-brake-system controls in a manner to effect said released operational state of said park-brake system; and said one or more logic device(s) of said park-brake monitoring-system operate in accordance with logic that cause it/them to operate in such a manner that it/they perform the step of:

when a signal combination comprising a full-travel signal and a release-requested signal, which is a non-allowed signal combination, is communicated to said logic device(s), executing a malfunction-verification algorithm comprising the steps of:

starting a timing operation;

continuing said timing operation until said timing operation has been active for a malfunction-verification period or said signal combination comprising said full-travel signal and said release-requested signal is no longer being communicated to said logic device(s);

if said signal combination comprising said full-travel signal and said release-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and if said timing operation has been active for said malfunction-verification period before said signal combination comprising said full-travel signal and said release-requested signal ceases to be communicated to said logic device(s), producing a monitoring signal that is an error signal.

26. The vehicle of claim 25, wherein:

(a) said park-brake monitoring-system further comprises one or more park-brake system/park-brake monitoring-system malfunction-indicator(s) that is/are communicatively linked to said one or more logic device(s); and (b) said one or more logic device(s) of said park-brake monitoring-system operate in accordance with logic that cause it/them to operate in such a manner that it/they perform the step of:

activating one or more of said one or more park-brake system/park-brake monitoring-system malfunction-indicator(s) anytime one of said monitoring signals that is an error signal is produced.

27. The vehicle of claim 25, wherein:

(a) said one or more actual-state sensor(s) produce and communicate to said logic device(s) an over-travel signal when said park-brake-actuating components of said park-brake system are actuated to at least one position in an over-travel range of positions;

(b) said one or more selected-state sensor(s) produce and communicate to said logic device(s) a set-requested signal during any presence in said park-brake system-controls of conditions that are only present when an operator has manipulated said park-brake-system controls in a manner to effect said set operational state of said park-brake system; and (c) said one or more logic device(s) of said park-brake monitoring-system operate in accordance with logic that cause it/them to operate in such a manner that it/they perform the step of:

when a signal combination comprising a over-travel signal and a set-requested signal, which is a non-allowed signal combination, is communicated to said logic device(s), executing a malfunction-verification algorithm comprising the steps of:

starting a timing operation;

continuing said timing operation until said timing operation has been active for a malfunction-verification period or said signal combination comprising said over-travel signal and said set-requested signal is no longer being communicated to said logic device(s);

if said signal combination comprising said over-travel signal and said set-requested signal ceases to be communicated to said logic device(s) before said timing operation has been active for said malfunction-verification period, terminating execution of said malfunction-verification algorithm and waiting until a non-allowed signal combination is once again communicated to said logic device(s) before initiating another execution of said malfunction-verification algorithm; and if said timing operation has been active for said malfunction-verification period before said signal combination comprising said over-travel signal and said set-requested signal ceases to be communicated to said logic device(s), producing a monitoring signal that is an error signal.

28. The vehicle of claim 27, wherein:

(a) said park-brake monitoring-system further comprises one or more park-brake system/park-brake monitoring-system malfunction-indicator(s) that is/are communicatively linked to said one or more logic device(s); and (b) said one or more logic device(s) of said park-brake monitoring-system operate in accordance with logic that cause it/them to operate in such a manner that it/they perform the step of:

activating one or more of said one or more park-brake system/park-brake monitoring-system malfunction-indicator(s) anytime one of said monitoring signals that is an error signal is produced.

* * * * *